(12) United States Patent  
Kim et al.

(10) Patent No.: US 9,983,628 B2  
(45) Date of Patent: May 29, 2018

(54) FLEXIBLE APPARATUS AND CONTROL METHOD THEREOF

(71) Applicant: SAMSUNG ELECTRONICS CO., LTD., Suwon-si (KR)

(72) Inventors: Hyun-jin Kim, Seoul (KR); Nipun Kumar, Suwon-si (KR); Joon-kyu Seo, Suwon-si (KR); Kyung-a Kang, Seoul (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 13/646,269

(22) Filed: Oct. 5, 2012

(65) Prior Publication Data

US 2014/0055375 A1    Feb. 27, 2014

(30) Foreign Application Priority Data

Aug. 23, 2012 (KR) ........................ 10-2012-0092632

(51) Int. Cl.
*G06F 1/16* (2006.01)
*G06F 3/0487* (2013.01)

(52) U.S. Cl.
CPC .......... *G06F 1/1652* (2013.01); *G06F 3/0487* (2013.01)

(58) Field of Classification Search
None
See application file for complete search history.

(56) References Cited

U.S. PATENT DOCUMENTS

| 8,581,859 | B2 | 11/2013 | Okumura et al. |
| 8,654,075 | B2 | 2/2014 | Kim |
| 2004/0008191 | A1* | 1/2004 | Poupyrev ................ G06F 3/011 345/184 |
| 2006/0218501 | A1 | 9/2006 | Wilson et al. |
| 2009/0219247 | A1* | 9/2009 | Watanabe ............. G06F 1/1615 345/157 |
| 2010/0011291 | A1 | 1/2010 | Nurmi |
| 2010/0117975 | A1 | 5/2010 | Cho |
| 2010/0141605 | A1 | 6/2010 | Kang et al. |
| 2010/0164888 | A1 | 7/2010 | Okumura et al. |

(Continued)

FOREIGN PATENT DOCUMENTS

| CN | 101782804 A | 7/2010 |
| CN | 102566816 A | 7/2012 |

(Continued)

OTHER PUBLICATIONS

International Search Report, dated May 31, 2013, issued by the International Searching Authority in counterpart International Application No. PCT/KR2013/000061.

(Continued)

*Primary Examiner* — Jennifer Mehmood
*Assistant Examiner* — Parul Gupta
(74) *Attorney, Agent, or Firm* — Sughrue Mion, PLLC

(57) ABSTRACT

A flexible apparatus and a control method thereof are provided. The flexible apparatus includes: a sensor which senses a bending of the flexible apparatus; and a controller which, if a bending line which is formed based on the bending is continuously moved in a first direction and thus reaches a location which corresponds to a display location of at least one object, provides a visual feedback with respect to the at least one object.

16 Claims, 39 Drawing Sheets

(56) References Cited

U.S. PATENT DOCUMENTS

| | | | |
|---|---|---|---|
| 2011/0057873 A1 | 3/2011 | Geissler et al. | |
| 2011/0084898 A1 | 4/2011 | Ebbeling et al. | |
| 2011/0134087 A1 | 6/2011 | Moriwaki | |
| 2011/0227822 A1* | 9/2011 | Shai | 345/156 |
| 2011/0304557 A1* | 12/2011 | Wilburn | G06F 3/0488 345/173 |
| 2012/0115422 A1 | 5/2012 | Tziortzis et al. | |
| 2012/0133621 A1* | 5/2012 | Kim | H04M 1/0206 345/204 |
| 2012/0139834 A1 | 6/2012 | Han et al. | |
| 2013/0120239 A1 | 5/2013 | Suzuki et al. | |
| 2013/0120302 A1 | 5/2013 | Kang et al. | |

FOREIGN PATENT DOCUMENTS

| | | |
|---|---|---|
| EP | 2581808 A1 | 4/2013 |
| JP | 200421528 A | 1/2004 |
| JP | 2004-192241 A | 7/2004 |
| JP | 2008-226263 A | 9/2008 |
| JP | 2010-157060 A | 7/2010 |
| JP | 2013-105310 A | 5/2015 |
| KR | 1020070094335 A | 9/2007 |
| KR | 1020100052227 A | 5/2010 |
| KR | 1020100065418 A | 6/2010 |
| RU | 2010142156 A | 4/2012 |

OTHER PUBLICATIONS

Written Opinion, dated May 31, 2013, issued by the International Searching Authority in counterpart International Application No. PCT/KR2013/000061.

Goyal, N., "COMET: Collaboration in Applications for Mobile Environments by Twisting", Interact, Aug. 2009, pp. 1-6, XP 055021260.

Communication dated Dec. 17, 2015, issued by the European Patent Office in counterpart European Patent Application No. 13831609.6.

Communication dated Feb. 4, 2017, issued by the State Intellectual Property Office of P.R. China in counterpart Chinese Application No. 201380055559.8.

Communication dated Nov. 3, 2016, issued by the Federal Service for Intellectual Property in counterpart Russian Patent Application No. 2015110037.

Communication dated Dec. 2, 2016, issued by the European Patent Office in counterpart European Patent Application No. 13831609.6.

Communication dated Dec. 5, 2016, issued by the Japanese Patent Office in counterpart Japanese Patent Application No. 2015-528376.

Communication dated Jun. 14, 2017, issued by the Russian Patent Office in counterpart Russian Application No. 2015110037.

Communication dated Jun. 26, 2017, issued by the Japanese Patent Office in counterpart Japanese Application No. 2015-528376.

Communication dated Aug. 17, 2017, issued by the European Patent Office in counterpart European Application No. 13831609.6.

Communication dated Oct. 19, 2017 by the State Intellectual Property Office of P.R. China in counterpart Chinese Patent Application No. 201380055559.8.

Communication dated Mar. 28, 2018, issued by the European Patent Office in counterpart European application No. 13 831 609.6.

Communication dated Feb. 22, 2018, issued by the Australian Patent Office in counterpart Australian application No. 2013306644.

\* cited by examiner (a)

(b)

FLEXIBLE APPARATUS AND CONTROL METHOD THEREOF

CROSS-REFERENCE TO RELATED APPLICATION(S)

This application claims priority under 35 U.S.C. § 119 from Korean Patent Application No. 10-2012-0092632, filed on Aug. 23, 2012, in the Korean Intellectual Property Office, the disclosure of which is incorporated herein by reference in its entirety.

BACKGROUND

1. Field

Exemplary embodiments disclosed herein generally relate to a flexible apparatus and a control method thereof, and more particularly, to a flexible apparatus which provides a feedback effect based on bending and a control method thereof.

2. Description of the Related Art

The development of electronic technologies has been accompanied by the development of various types of display apparatuses. In particular, display apparatuses, such as a television (TV), a personal computer (PC), a laptop computer, a tablet PC, a cellular phone, an MP3 player, and other similar types of devices, have high supply ratios and thus are used in most homes.

In order to meet needs of users for newer and various functions, efforts to develop display apparatuses in newer forms have been made. Such a display apparatus is referred to as a next generation display apparatus.

An example of the next generation display apparatus includes a flexible display apparatus. The term "flexible display apparatus" refers to a display apparatus which may be physically transformed in a relatively flexible manner, like paper.

The flexible display apparatus may be bent by a force applied by a user to be transformed and thus may be used for various purposes. For example, the flexible display apparatus may be realized as a portable apparatus such as a cellular phone, a tablet PC, an electronic frame, a personal digital assistant (PDA), an MP3 player, or the like.

A method of using a shape transformation characteristic of such a flexible display apparatus to provide various screens is required.

SUMMARY

Exemplary embodiments address at least the above problems and/or disadvantages and other disadvantages not described above. Further, the exemplary embodiments are not required to overcome the disadvantages described above, and an exemplary embodiment may not overcome any of the problems described above.

The exemplary embodiments provide a flexible apparatus which provides various types of screen feedback effects based on a move of a bending area and a control method thereof.

According to an aspect of the exemplary embodiments, there is provided a flexible apparatus including: a sensor which senses a bending of the flexible apparatus; and a controller which, if a bending line which is formed based on the bending is continuously moved in a first direction and thus reaches a location which corresponds to a display location of at least one object, controls to provide a visual feedback with respect to the at least one object.

The flexible apparatus may further include a display which displays the at least one object. If the bending line reaches the location of the at least one object displayed on the display, the controller may control the display to provide a visual feedback with respect to the at least one object.

The flexible apparatus may further include a first communicator which is connected to a display apparatus which displays the at least one object. If the bending line reaches a location corresponding to a display location of the at least one object displayed on the display apparatus, the controller may control the display apparatus to provide a visual feedback with respect to the at least one object.

The controller may control to provide a first visual feedback with respect to the at least one object which first visual feedback is different from a second visual feedback with respect to at least a second object.

The visual feedback may include at least one of a zoom-in/zoom-out effect, a highlight effect, a content execution effect, a lower menu display effect, and a detailed content display effect.

The controller may control to provide a visual feedback based on at least one of a move speed of the bending line, a move direction of the bending line, and a move distance of the bending line.

According to another aspect of the exemplary embodiments, there is provided a flexible apparatus including: a sensor which senses a bending of the flexible apparatus; and a controller which, if a bending line which is formed in a first location based on the bending is continuously moved in a first direction, controls to move at least one object, which is displayed in a first display location which corresponds to the first location, into a second display location which corresponds to a second location, and which controls to display the at least one object in the second display location.

The at least one object may be displayed in one of a display device of the flexible apparatus and an external display apparatus.

The controller may control to transmit the at least one object, which has been moved into the second display location which corresponds to the second location, to an external device which corresponds to the second display location.

When the at least one object is transmitted to the external device, the controller may control to cause the at least one object to disappear from the second display location.

According to an aspect of the exemplary embodiments, there is provided a method for controlling a flexible apparatus. The method may include: sensing a bending of the flexible apparatus; and if a bending line which is formed based on the bending is continuously moved in a first direction and thus reaches a location which corresponds to a display location of at least one object, controlling to provide a visual feedback with respect to the at least one object.

The method may further include: displaying the at least one object. If the bending line reaches the location which corresponds to the display location of the displayed at least one object, the visual feedback may be controlled to be provided with respect to the at least one object.

The method may further include: communicating with a display apparatus which displays the at least one object. If the bending line reaches the location which corresponds to the display location of the at least one object displayed by the display apparatus, a control signal for providing the visual feedback with respect to the at least one object may be transmitted to the display apparatus.

A first visual feedback may be controlled to be provided with respect to the at least one object, which first visual feedback may be different from a second visual feedback with respect to at least a second object.

The visual feedback may include at least one of a zoom-in/zoom-out effect, a highlight effect, a content execution effect, a lower menu display effect, and a detailed content display effect.

The visual feedback may be controlled to be provided based on at least one of a move speed of the bending line, a move direction of the bending link, and a move distance of the bending line.

According to another aspect of the exemplary embodiments, there is provided a method for controlling a flexible apparatus. The method may include: sensing a bending of the flexible apparatus; and if a bending line which is formed in a first location based on the bending is continuously moved in a first direction and thus reaches a second location, moving at least one object which is displayed in a first display location which corresponds to the first location into a second display location which corresponds to the second location and displaying the at least one object in the second display location.

The at least one object may be displayed on one of a display device installed in the flexible apparatus and an external display apparatus.

The method may further include: transmitting the at least one object, which has been moved into the second display location which corresponds to the second location, to an external device which corresponds to the second display location.

The method may further include: when the at least one object is transmitted to the external device, controlling to cause the at least one object to disappear from the second display location.

As described above, according to the exemplary embodiments, an intuitive feedback based on a bending of a flexible apparatus may be provided to a user.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
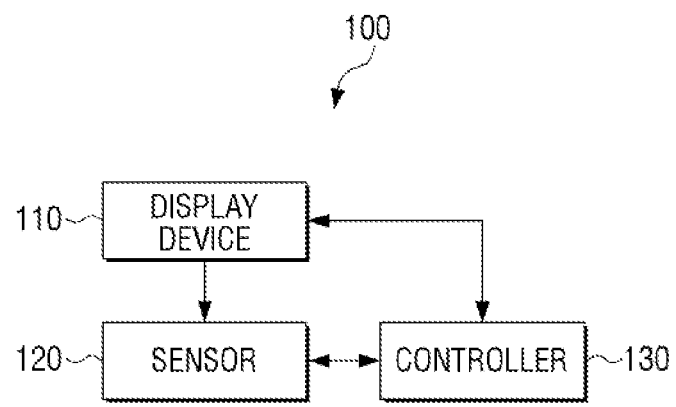
FIG. 1 is a block diagram which illustrates a structure of a flexible display apparatus according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Further, well-known functions or constructions are not described in detail since they would obscure the exemplary embodiments with unnecessary detail.

FIG. 1 is a block diagram which illustrates a structure of a flexible display apparatus 100, according to an exemplary embodiment. Referring to FIG. 1, the flexible display apparatus 100 includes a display device 110, a sensor 120, and a controller 130.

The display device 110 displays a screen. The flexible display apparatus 100, including the display device 110, is bendable. Therefore, the display device 110 is formed by using a bendable material in a bendable structure. A detailed structure of the display device 110 will be described below.

The sensor 120 senses a bending of the flexible display apparatus 100 (or the display device 110).

In particular, the sensor 120 senses a change of a bending state which is formed by a user control performed with respect to the display device 110. In particular, the sensor 120 senses a move state of a bending line which is formed in the display device 110.

If the change of the bending state is sensed, the controller 130 changes a display state of the screen based on the change of the bending state. In particular, the change of the bending state may include a continuous move state of the bending line. The continuous move state of the bending line may include a continuous move state of one bending line, continuous move states of two or more bending lines, a bending level changing state (i.e., a move of a bending area on a Z axis), or any other type of continuous move relating to the bending line.

In an exemplary embodiment, the bending line may be defined as a line which connects points of bending areas at which bending levels are the greatest. For example, a line which connects bending points (or bending coordinates) at which a resistance value outputted from a bend sensor is a relative maximum may be the bending line. A detailed description of this will be described below with reference to the drawings.

In particular, if it is sensed that the bending line has been continuously moved in a particular direction, the controller 130 provides a visual feedback corresponding thereto. For descriptive convenience, a bending operation of continuously moving the bending line in a particular direction is referred to as a bending move operation hereinafter. However, even if the bending line is not moved, but instead, only a bending angle is changed, the bending operation may correspond to the bending move operation.

In particular, if it is sensed that the bending line has been continuously moved in a first direction (e.g., in a horizontal or vertical direction) and thus has reached a position relating to at least one object, the controller 130 provides a visual feedback with respect to the at least one object. In this case, the controller 130 provides a different visual feedback from a second visual feedback with respect to another object. For example, at least one visual feedback from among a zoom-in/zoom-out effect, a highlight effect, a content execution effect, a lower menu display effect, and a detailed content display effect may be provided due to the move of the bending line. The controller 130 also varies a visual feedback based on at least one of a move speed of the bending line, a move direction of the bending line, and a move distance of the bending line.

The controller 130 provides a feedback effect such that the move direction of the bending line is physically or systematically equal to an advancing direction of a user interface (UI) change on the screen. For example, the controller 130 may control to move and display an object displayed on the screen in the same direction in correspondence with the move of the bending line. In detail, the controller 130 may control to move and display at least one object which is displayed on a first bending line onto a second bending line which is formed as a result of a move of the first bending line. Alternatively, the controller 130 may control to sequentially display items systematically arranged in the same direction based on the move of the bending line.

If the object displayed on the first bending line is moved and displayed onto the second bending line, the controller 130 may provide a visual feedback with respect to the object, which visual feedback occurs due to the move of the bending line.

In this case, the controller 130 may vary a visual feedback based on at least one of the move speed of the bending line, the move direction of the bending line, and the move distance of the bending line. In particular, the move direction of the bending line may be determined as being a direction in which the bending line is moved, and the move distance may be determined as an amount of displacement of the bending line along the bending line. Further, the move speed may be determined as being a respective move distance with respect to a corresponding change in time.

For example, the controller 130 may variably display a change speed of a graphical user interface (GUI) displayed on the screen based on the move speed of the bending line. In particular, the visual feedback may include at least one of a zoom-in/zoom-out effect, a highlight effect, a 3-dimensional (3D) navigation effect, a content execution effect, and a detailed content display effect.

A position change of the bending line may be determined based on changes of a position and a gradient of the bending line. For example, the position change of the bending line may be defined by an initial position, a stopover position, and/or a complete position of the bending line as determined by bending controls. In this case, the controller 130 may provide a variable visual feedback based on at least one of the initial position, the stopover position, and the complete position of the bending line as determined by the bending controls. For example, in the initial position, a visual feedback may be provided such that a functional change does not occur, and a move control is recognized. In the stopover position, a functional change may be visually shown and may continuously occur.

In this case, the controller 130 may provide a cue with respect to the above-described three-step position change. For example, if an unlock function is provided, the controller 130 may provide a hint that an object sways and thus is unlocked by executing a bending move control in the initial position. Further, the controller 130 may visually display a target point of the complete position to provide a hint that the bending line is to be moved to a particular position in order to perform the unlock function.

The controller 130 may also variably provide a visual feedback effect based on at least one of a bending direction, a bending angle, a bending radius, and a bending number. In particular, the bending direction may be divided into Z+ and Z− directions based on the Z axis, i.e., Z+ and Z− directions when a front surface of the flexible display apparatus 100 is defined as the zero plane, i.e., the origin of the Z axis.

The bending angle may be defined as changes of an angle when bending starts and ends, e.g., as 15°, 30°, 45°, 60°, 90°, 120°, etc.

The bending radius may be defined as a curvature radius R as determined by bending. For example, the controller 130 may provide variable feedback effects which vary as a function of the bending radius, e.g., if the bending line continuously moves when the bending radius is great and if the bending line continuously moves when the bending radius is small.

Further, if the object displayed in the first bending line is moved and displayed onto the second bending line, the controller 130 may control to transmit at least one object to an external apparatus which corresponds to the second bending line.

If the object displayed on the second bending line is transmitted to the external apparatus which corresponds thereto, the controller 130 may control to cause the object being displayed on the second bending line to disappear from the display on the second bending line. In this case, the controller 130 may divide the screen of the display device 110 into a plurality of areas, respectively allocate each of the plurality of areas to a corresponding connectable external apparatus, and transmit a respective object to the corresponding external apparatus which is allocated to the area that corresponds to a position to which the bending line has been moved.

If the respective object is transmitted to the corresponding external apparatus, the controller 130 may control to cause the object displayed on the second bending line to disappear.

If the bending line is moved based on the bending move control, the controller 130 may change a mode of the screen based on an area in which the moved bending line is positioned.

In particular, the controller 130 may divide the screen of the display device 110 into at least two areas and respectively allocate particular modes to the areas. For example, the controller 130 may divide the screen of the display device 110 into two areas and respectively allocate a Lock mode to a first area of the two areas and an Unlock mode to a second area of the two areas. If the bending line which was positioned in a Lock mode area is moved to an Unlock mode area based on a bending move control, the controller 130 may cancel a lock state in order to change the lock state to an unlock state.

As another example, the controller 130 may divide the screen of the display device 110 into three areas and respectively allocate a thumbnail view mode to a first area, a title view mode to a second area, and a list view mode to a third area of the three areas. If an area in which the bending line is positioned changes based on a bending move control, the controller 130 may change and display an attribute of a content based on a mode of the area in which the bending line is newly positioned. If the position of the bending line moves from an area corresponding to the thumbnail view mode to an area corresponding to the title view mode, a display state may be changed to delete a thumbnail of the content in order to display title information.

The sensor 120 matches the screen of the display device 110 with a two-dimensional (2D) coordinate system to output a coordinate value of the bending line to the controller 130. In this case, if the coordinate value of the bending line is continuously changed in a particular direction, the controller 130 determines that the bending line has been continuously moved in the particular direction.

If it is determined that the bending line has been continuously moved in the particular direction, i.e., it is determined that a move of the bending line falls within a preset move range, the controller 130 provides a predetermined feedback.

If it is determined that the move of the bending line does not fall within the preset move range, the controller 130 provides a feedback in a graphic form which reflects a transformed degree. In this case, the transformed degree may be determined based on the move speed and the move direction of the bending line, and a position of the bending line on the Z axis.

In particular, the controller 130 provides various types of feedback effects to a graphic displayed in a position of the bending line based on a move of the bending line. For example, the controller 130 may provide feedback effects such as, for example, splitting of the graphic, returning, showing with a line, a color change of the graphic, and/or any other types of feedback changes which are graphically displayable.

The controller 130 provides various types of feedback effects to the graphic displayed on the bending line based on the position of the bending line on the Z axis. For example, the controller 130 may provide feedback effects such as, for example, an expansion/contraction of the graphic, showing of the hidden graphic, hiding of the shown graphic, and/or any other types of feedback effects which are based on changes of positive and negative positions of the bending line on the Z axis.

One bending line has been described in the above-described exemplary embodiment, but this is only exemplary. Therefore, two or more bending lines may exist.

If two or more bending lines are moved, a bending area may be moved. Further, a visual feedback may be provided such that graphic elements displayed on the screen are spatially re-arranged based on changes of a bending shape, or a detailed degree of a content may be changed.

If the bending line is moved on the Z axis, visual feedbacks, such as a content navigation, a change to a default screen, touch interaction enabling, a change from the default screen to a content navigation screen, and/or any other types of visual feedback which relate to a movement of the bending line on the Z axis, may be provided.

For example, if the bending line is moved from positive Z axis to the negative Z axis or from the negative Z axis to the positive Z axis, a visual feedback, such as navigating of contents arranged on the Z axis, may be provided.

If the bending line is moved from the positive Z axis or from the negative Z axis to the zero plane, a feedback effect of changing a current screen to a default screen or enabling a touch interaction may be provided.

If the bending line is moved from the zero plane to either of the positive Z axis or the negative Z axis, a feedback effect of changing the default screen to a content navigation screen on a 3D space may be provided.

The controller 130 may provide a feedback effect such that the move direction of the bending line is physically or semantically equal to the advancing direction of the UI change on the screen. For example, if the bending line is moved from the left to the right, the controller 130 may provide a feedback effect such that the UI change on the screen is also moved from the left to the right, or items systematically arranged from the right to the left are sequentially displayed.

The controller 130 may provide a page change effect based on the bending move control, and may be used for games (e.g., a game of keeping beat time, etc.), education, and allshare platform control (remote controller). In particular, the controller 130 may provide the page change effect to increase and/or decrease a page change speed based on the bending move control.

The feedback effect which is provided based on the bending move control may be variously realized in accordance with a type of the flexible display apparatus 100. In particular, the flexible display apparatus 100 may provide a feedback effect which corresponds to a bending move control based on a type thereof.

For example, if the flexible display apparatus 100 is a cellular phone, the controller 130 may perform one of various operations, including, for example, a phone call, a call rejection, a menu display, character transmission and reception, application selection and execution, web browser execution and ending, and/or any other type of operation relating to a cellular phone, based on the bending move control. As another example, if the flexible display apparatus 100 is a TV, the controller 130 may perform various operations, including, for example, a channel selection, a volume adjustment, a luminance adjustment, a color adjustment, a contrast adjustment, and/or any other type of operation relating to a TV, based on the bending move control. The flexible display apparatus 100 may be realized as various types of display apparatuses, such as, for example, a PDA, an electronic frame, an e-book, an electronic notebook, an MP3 player, a tablet PC, a laptop computer, a monitor, and/or any other type of display apparatus. Further, the controller 130 may perform various operations which correspond to characteristics of the above-mentioned apparatuses. The controller 130 may perform a general operation such as a lock operation, an unlock operation, a turn-on operation, a turn-off operation, and/or any other type of general operation based on the bending move control, regardless of the type of the flexible display apparatus 100.

The feedback effect which is provided based on the bending move control may be variously realized in accordance with an application executed by the flexible display apparatus 100. In particular, a screen corresponding to at least one of functions supported by the application may be displayed based on the bending move control. For example, if an e-book application is executed, a screen corresponding to at least one of various functions, including a content change, a page change, a page expansion, a page contraction, a bookmark function, and/or any other type of function relating to an e-book, may be displayed based on the bending move control.

The flexible display apparatus 100 may pre-store information relating to a screen display state and a screen display function based on the bending move control. The controller 130 may check the screen display state and the screen display function based on the bending move control from the pre-stored information.

As described above, the display device 110 is formed in a bendable form. The sensor 120 may sense a bending state by using one or more of various methods.

A detailed structure of the display device 110 and a method for sensing a bending of the display device 110 will now be described in detail.

Figure 2:
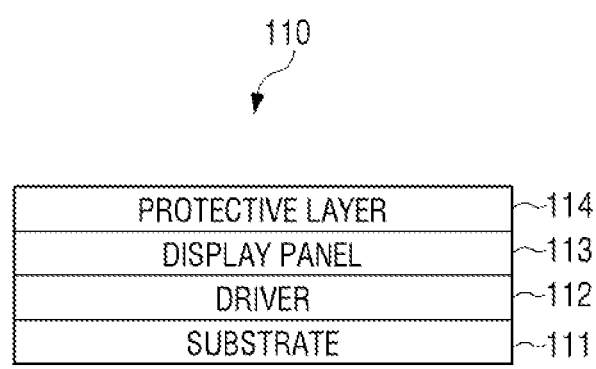
FIG. 2 is a view which illustrates a basic structure of a display apparatus constituting a flexible display apparatus according to an exemplary embodiment.

FIG. 2 is a view which illustrates a basic structure of the display device 110 constituting the flexible display apparatus 100, according to an exemplary embodiment. Referring to FIG. 2, the display device 110 includes a substrate 111, a driver 112, a display panel 113, and a protective layer 114.

The flexible display apparatus 100 refers to an apparatus which has a display characteristic of an existing flat panel display apparatus and is bendable, foldable, or rollable like paper. Therefore, the flexible display apparatus is to be fabricated on a flexible substrate.

In particular, the substrate 111 may be realized as a plastic substrate (e.g., a polymer film) which may be transformed by an external pressure.

The plastic substrate has a structure in which both sides of a base film are treated with barrier coating. The base film may be formed of various types of resins such as, for example, polyimide (PI), polycarbonite (PC), polyethyleneterephtalate (PET), polyethersulfone (PES), polythylenenaphthalate (PEN), fiber reinforced plastic (FRP), and/or any other appropriate type of resin. The barrier coating may be performed with respect to opposite surfaces of the base film, and may include an organic film or an inorganic film to maintain flexibility.

The substrate 111 may be formed by using a material having a flexible characteristic such as thin glass, metal foil, or the like, instead of a plastic material as used in the plastic substrate.

The driver 112 drives the display panel 113. In particular, the driver 112 applies a driving voltage to a plurality of pixels constituting the display panel 113 and may be realized as an amorphous silicon (a-Si) thin film transistor (TFT), a low temperature poly silicon (LTPS) TFT, an organic TFT (OTFT), or the like. The driver 112 may be realized as various types, based on a realized type of the display panel 113. For example, the display panel 113 may include an organic light-emitting device which includes a plurality of pixel cells and an electrode layer which covers both sides of the organic light-emitting device. In this case, the driver 112 may include a plurality of transistors respectively corresponding to the plurality of pixel cells of the display panel 113. The controller 130 applies an electrical signal to gates of the transistors, which causes an emission of light from the pixel cells connected to the transistors. Therefore, an image may be displayed.

Alternatively, the display panel 113 may be realized as an organic light-emitting diode (OLED), an electroluminescence (EL), an electrophoretic display (EPD), an electrochromic display (ECD), a liquid crystal display (LCD), an active matrix LCD (AMLCD), a plasma display panel (PDP), or the like. The LCD cannot self-emit light and thus requires additional backlight. An LCD which does not use backlight uses ambient light. Therefore, a condition, such as an outside environment having a large amount of light, must be satisfied in order to use the LCD display panel 112 without backlight.

The protective layer 114 protects the display panel 113. For example, the protective layer 114 may be formed by using a material such as ZrO, $CeO_2$, $ThO_2$, or the like. The protective layer 114 may be fabricated in a transparent film form to cover a whole surface of the display panel 113.

In an alternative exemplary embodiment with respect to the exemplary embodiment shown in FIG. 2, the display device 110 may be realized as electronic paper (e-paper). The e-paper is a display which uses a characteristic of a general ink to paper, and is different from a general flat panel display in that the e-paper uses reflected light. The e-paper may change a picture or characters by using electrophoresis which is implemented by using a twist ball or a capsule.

If the display device 110 includes an element formed from a transparent material, the display device 110 may be realized as a display having bendable and transparent characteristics. For example, if the substrate 111 is formed from a polymer material such as plastic having a transparent characteristic, the driver 112 may be realized as a transparent transistor, and the display panel 113 may include a transparent organic light-emitting layer and a transparent electrode, and thus, the display device 110 may have transparency.

The transparent transistor refers to a transistor which is fabricated by replacing opaque silicon of an existing TFT with a transparent material such as transparent ZnO, TiO2, or the like. The transparent electrode may be formed from a new material such as indium thin oxide (ITO) or graphene. Graphene is a material which has a hive-shaped flat structure formed from connections of carbon atoms, and has a transparent characteristic. The transparent organic light-emitting layer may be formed by using any one or more of various kinds of materials.

Figure 3:
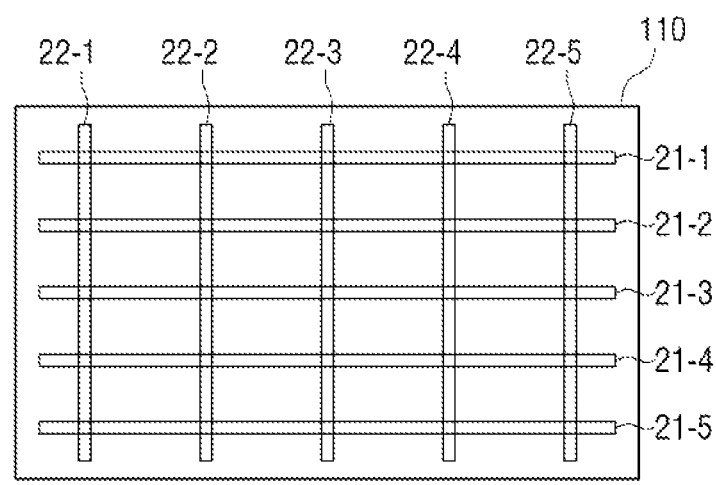
FIGS. 3, 4, and 5 are views which illustrate a method for sensing a bending, according to an exemplary embodiment.

FIG. 3 is a view which illustrates a method for sensing bending according to an exemplary embodiment.

The flexible display apparatus 100 is bent by an external pressure, and thus a shape thereof is transformed. Bending may include any or all of normal bending, folding, and rolling. In particular, the normal bending refers to a state in which the flexible display apparatus 100 is bent.

The folding refers to a state in which the flexible display apparatus 100 is folded. In particular, the folding and the normal bending may be classified based on a bending level. For example, if an amount of bending is performed at a predetermined bending angle or more, the bending may be defined as folding. If the amount of bending is performed at the predetermined bending angle or less, the bending may be defined as normal bending.

The rolling refers to a state in which the flexible display apparatus 100 is rolled. The rolling may also be determined based on a bending angle. For example, a state in which an amount of bending at the predetermined angle or more is sensed over a predetermined area may be defined as rolling. A state in which the amount of bending at the predetermined bending angle or less is sensed in a relatively smaller area than rolling may be defined as folding. The normal bending, the folding, and the rolling, as described above, may alternatively be determined based on a curvature radius instead of being determined based on the bending angle.

A state in which a cross-section of the flexible display apparatus 100 which is rolled has a substantially circular or elliptical shape regardless of the curvature radius may be defined as rolling.

However, the definitions of various shape transformation examples are only exemplary. Therefore, the transformation of the shape of the flexible display apparatus 100 may be variably defined based on a type, a size, a weight, a characteristic, and/or any other relevant physical characteristic of the flexible display apparatus 100. If bending is possible such that parts of a surface of the flexible display apparatus 100 contact each other, folding may be defined as a state in which the parts of the surface of the flexible display apparatus contact each other simultaneously with bending. Rolling may be defined as a state in which front and back surfaces of the flexible display apparatus 100 contact each other due to bending.

For descriptive convenience, a normal bending state will be hereinafter described as a bending state according to an exemplary embodiment.

The flexible display apparatus 100 may sense bending based on any one or more of various methods.

For example, the sensor 120 may include a bend sensor which is disposed on one of front and back surfaces of the display device 110, or a bend sensor disposed on both the front and back surfaces of the display device 110. The controller 130 may sense bending by using a value sensed by the bend sensor of the sensor 120.

In particular, the bend sensor refers to a sensor which is bendable and has a resistance value which varies based on a bending level. The bend sensor may be realized as various types, such as, for example, a bending sensor, a pressure sensor, a strain gauge, and/or any other appropriate type of sensing device.

The sensor 120 senses the resistance value of the bend sensor by using a level of a voltage applied to the bend sensor and a level of a current flowing in the bend sensor, and senses a bending state in a position of the bend sensor based on a magnitude of the resistance value.

The bend sensor is installed on the front surface of the display device 110 illustrated in FIG. 3, but this is only exemplary. Therefore, the bend sensor may be installed on the back surface of the display device 110, or on both the front and back surfaces of the display device 110. Further, a shape, the number, and an arrangement position of the bend sensor may be variously changed. For example, one bend sensor or a plurality of bend sensors may be combined with the display device 110. In particular, the one bend sensor may sense one piece of bending data, or may include a plurality of sensing channels which respectively sense a plurality of pieces of bending data.

In FIG. 3, each of a plurality of bend sensors is respectively disposed in one of a horizontal direction and a vertical direction in order to collectively form a lattice shape.

Referring to FIG. 3, the bend sensors include bend sensors 21-1, 21-2, 21-3, 21-4, and 21-5 which are arranged in a first direction and bend sensors 22-1, 22-2, 22-3, 22-4, and 22-5 which are arranged in a second direction. The bend sensors may keep respective predetermined distances from one another.

In FIG. 3, the five bend sensors 21-1 through 21-5 are arranged in the horizontal direction, and the five bend sensors 22-1 through 22-5 are arranged in the vertical direction, but this is only exemplary. Therefore, the number of bend sensors may vary based the size and/or any other relevant physical characteristic of the flexible display apparatus 100. As described above, the bend sensors are arranged in the horizontal and vertical directions to sense a bending which occurs in a whole area of the flexible display apparatus 100. Therefore, in an apparatus which is partially flexible or is designed to sense bending of a part, bend sensors may be arranged in the corresponding part.

The bend sensor 21-1 through 21-5 and 22-1 through 22-5 may be realized as electrical resistance type sensors which use electrical resistances or as micro optical fiber sensors which use deformation rates of optical fibers. For descriptive convenience, the bend sensors will be hereinafter described as electrical resistance type sensors.

Figure 4:
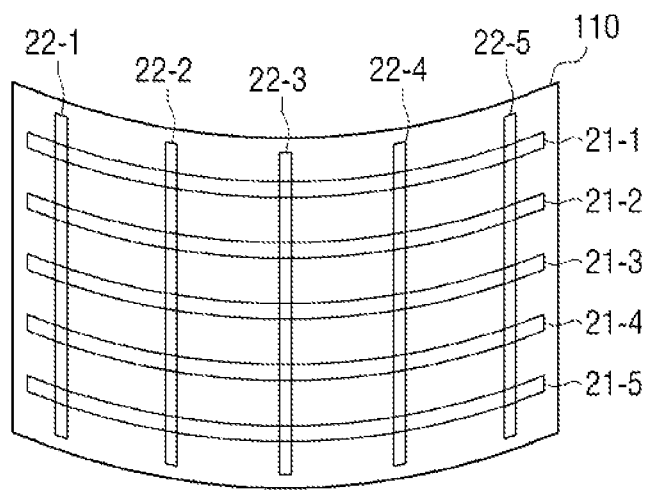

In particular, if the flexible display apparatus 100 is bent so that a central area positioned in a center based on left and right edges of the flexible display apparatus 100 faces downwards, a tension generated by the bending is applied to each of the bend sensors 21-1 through 21-5 which are arranged in the horizontal direction. Therefore, resistance values sensed by each of the bend sensors 21-1 through 21-5 arranged in the horizontal direction vary. The sensor 120 senses changes of output values outputted from the respective bend sensors 21-1 through 21-5 to sense that bending has occurred in the horizontal direction based on a center of a display surface. In FIG. 4, the central area is bent in a vertical downward direction (hereinafter referred to as a Z− direction) based on the display surface. However, even if the central area is bent in a vertical upward direction (hereinafter referred to as a Z+ direction) based on the display surface, the sensor 120 may sense a shape deformation of the flexible display apparatus based on the changes of the respective output resistance values of each of the bend sensors 21-1 through 21-5 which are arranged in the horizontal direction.

Figure 5:
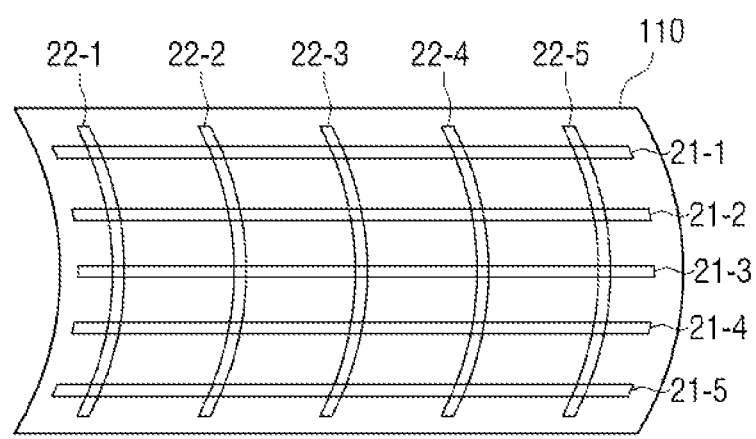

If the flexible display apparatus 100 is bent so that the central area positioned in the center based on upper and lower edges of the flexible display apparatus 100 faces rightwards, the tension is applied to each of the bend sensors 22-1 through 22-5 which are arranged in the vertical direction. The sensor 120 may sense a shape deformation of the flexible display apparatus 100 in the vertical direction based on output values of the respective bend sensors 22-1 through 22-5 which are arranged in the vertical direction. Bending in the Z+ direction is shown in FIG. 5, but bending in the Z− direction may sensed by using the respective bend sensors 22-1 through 22-5 which are arranged in the vertical direction.

If the shape of the flexible display apparatus 100 is deformed in an diagonal direction, the tension is applied to all the bend sensors which are arranged in either of the horizontal and vertical directions. Therefore, the shape deformation in the diagonal direction may be sensed by using the output values of the bend sensors which are arranged in either of the horizontal and vertical directions.

Detailed methods for sensing deformed shapes such as normal bending, folding, and rolling by using bend sensors will now be described.

Figure 6:
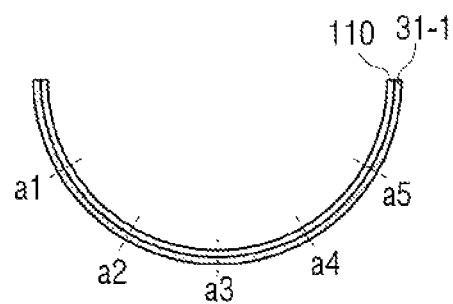
FIGS. 6 and 7 are views which illustrate a method for sensing bending in a flexible display apparatus by using a band sensor, according to an exemplary embodiment.
Figure 7:
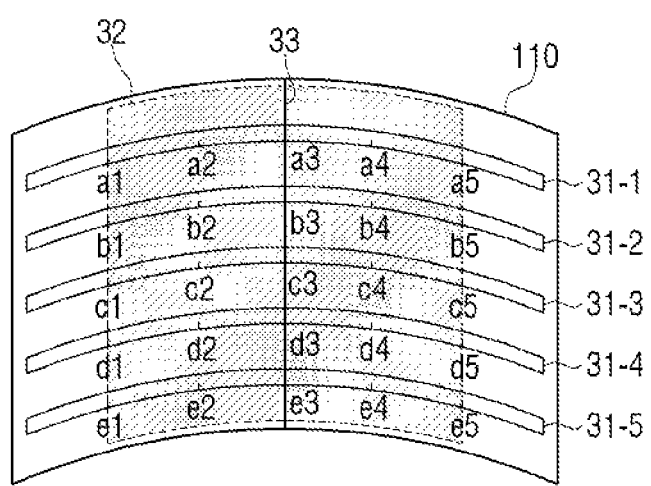

FIGS. 6 and 7 are views which illustrate a method for sensing bending in the flexible display apparatus 100 by using a bend sensor according to an exemplary embodiment.

FIG. 6 is a cross-sectional view which illustrates the flexible display apparatus 100 when the flexible display apparatus 100 is bent.

If the flexible display apparatus 100 is bent, a bend sensor disposed on a surface or both surfaces of the flexible display apparatus 100 is bent together, has a resistance value which corresponds to a strength of an applied tension, and outputs an output value which corresponds to the resistance value.

For example, if the flexible display apparatus 100 is bent as shown in FIG. 6, a bend sensor 31-1 disposed on a back surface of the flexible display apparatus 100 is also bent, and outputs a resistance value based on a corresponding strength of an applied tension.

In this case, the strength of the tension increases in proportion to a bending level. For example, if bending occurs as shown in FIG. 6, a bending level of a central area is the greatest. Therefore, a greatest tension is applied to the bend sensor 31-1 disposed in location a3 which is the central area, and thus the bend sensor 31-1 outputs the greatest resistance value with respect to location a3. The bending level weakens toward the outside. Therefore, the bend sensor 31-1 outputs a smaller resistance value with respect to each of location a1, location a2, location a4, and location a5 as compared with the corresponding resistance value which is based on the location a3.

If a resistance value outputted from a bend sensor has a maximum value which is associated with a particular location and the respective resistance value gradually decreases as the corresponding location varies toward both directions, the sensor 120 may determine that an area from which a maximum resistance value has been detected is an area in which the greatest bending has occurred. Further, the sensor 120 may determine an area in which the resistance value does not change as a flat area in which bending does not occur, and the sensor 120 may determine an area in which the resistance value changes by an amount which is greater than a predetermined value as a bending area in which a relatively small amount of bending occurs.

FIG. 7 is a view which illustrates a method for defining a bending area according to an exemplary embodiment. In FIG. 7, the flexible display apparatus 100 is bent in a horizontal direction based on a front surface thereof. Therefore, for descriptive convenience, bend sensors arranged in a vertical direction are not shown. Further, for descriptive convenience, the bend sensors are labeled with reference numerals 31-1, 31-2, 31-3, 31-4, and 31-5 in the respective drawings. However, bend sensors having structures as shown in FIG. 3 may be used similarly in the exemplary embodiment illustrated in FIG. 7.

The bending area refers to an area of the flexible display apparatus 100 which is bent. The bend sensor is bent together due to bending, and thus the bending area may be defined as all locations in which a bend sensor outputs a different resistance value than a corresponding resistance value which is outputted with respect to an original location is disposed.

The sensor 120 may sense a size of a bending line, a direction of the bending line, a position of the bending line, the number of bending lines, the number of times of bending, a bending speed changing a shape, a size of a bending area, a position of the bending area, the number of bending areas, and/or any other relevant characteristic of the bending line or the bending area based on a relation between locations in which changes of a resistance value have been sensed.

In particular, if a distance between the locations in which the changes of the resistance value have been sensed is within a preset distance, the sensor 120 senses the locations outputting the resistance values as indicating one bending area. If the distance between the locations in which the changes of the resistance value have been sensed exceeds the preset distance, the sensor 120 may define the locations as indicating different bending areas. This will be described in more detail with reference to FIG. 7.

FIG. 7 is a view which illustrates a method for sensing one bending area. If the flexible display apparatus 100 is bent as shown in FIG. 7, a bend sensor 31-1 has different resistance values which vary from location a1 to location a5, a bend sensor 31-2 has different resistance values which vary from location b1 to location b5, a bend sensor 31-3 has different resistance values which vary from location c1 to location c5, a bend sensor 31-4 has different resistance values which vary from location d1 to location d5, and a bend sensor 31-5 has different resistance values which vary from location e1 to location to e5.

In this case, locations of each of the bend sensors 31-1 through 31-5 in which changes of resistance values have been sensed are continuously arranged within a preset distance.

Therefore, the sensor 120 senses an area 32, including all of the locations a1 through a5 of the bend sensor 31-1, all of the locations b1 through b5 of the bend sensors 31-2, all of the locations c1 through c5 of the bend sensor 31-3, all of the locations d1 through d5 of the bend sensor 31-4, and all of the locations e1 through e5 of the bend sensor 31-5, as referring to a single bending area.

The bending area may include a bending line. The bending line may include a line which connects respective locations of corresponding bend sensors at which a maximum value is outputted. In particular, the bending line may be defined as a line which connects locations of each bending area at which the greatest resistance value has been detected.

For example, in FIG. 7, a line 33, which connects the location a3 of the bend sensor 31-1 outputting the greatest resistance value, the location b3 of the bend sensor 31-2 outputting the greatest resistance value, the location c3 of the bend sensor 31-3 outputting the greatest resistance value, the location d3 of the bend sensor 31-4 outputting the greatest resistance value, and the location e3 of the bend sensor 31-5 outputting the greatest resistance value, may be defined as the bending line. In FIG. 7, the bending line 33 is formed in a vertical direction in a central area of the display surface.

Figure 8:
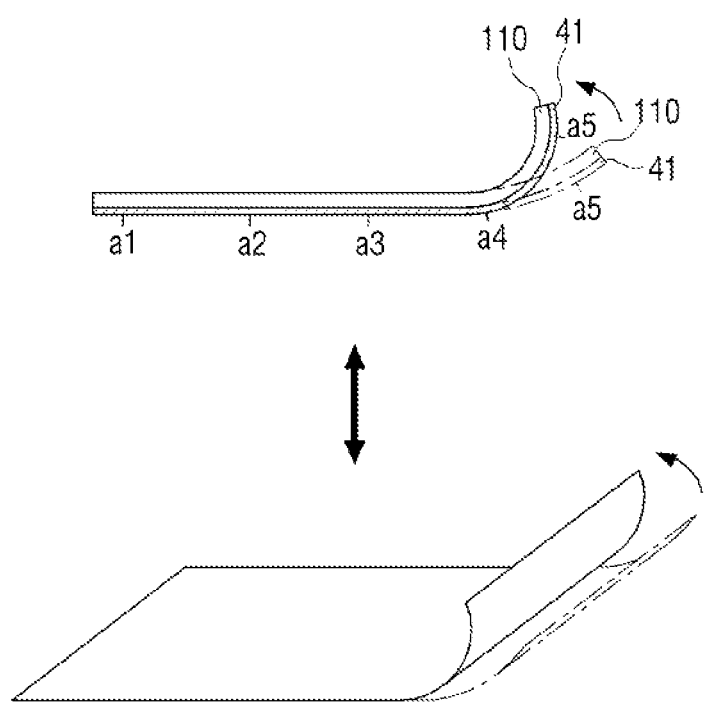
FIGS. 8 and 9 are views which illustrate a method for determining a bending level, according to an exemplary embodiment.

FIG. 8 is a view which illustrates a method for determining a bending level according to an exemplary embodiment.

Referring to FIG. 8, the flexible display apparatus 100 determines a bending level, i.e., a bending angle, thereof by using respective changes of a magnitude of a resistance value which is outputted from a bend sensor at predetermined intervals. In particular, the bending angle may be determined as being equal to a difference between a first angle which is determined when a bending move control starts and a second angle which is determined when a bending move control ends.

In particular, the controller 130 calculates a difference between a first resistance value relating to a first location of the bend sensor outputting the greatest resistance value and a second resistance value relating to a second location which is located at a predetermined distance from the first location.

The controller 130 also determines the bending level by using the calculated difference. In particular, the flexible display apparatus 100 divides the bending level into a plurality of levels and matches each respective level with a corresponding resistance value which falls within one of a plurality of predetermined ranges used for storing the resistance values.

Therefore, the flexible display apparatus 100 determines the bending level thereof based on one of the plurality of levels to which the calculated difference belongs.

For example, as shown in FIG. 8, the flexible display apparatus 100 may determine the bending level based on a difference between a first resistance value outputted from location a5 of a bend sensor 41 outputting the greatest resistance value and a second resistance value outputted from location a4 which is located at a predetermined distance from the location a5.

In particular, the flexible display apparatus 100 checks one of a plurality of pre-stored levels to which a resistance value calculated in the exemplary embodiment of FIG. 8 belongs, and determines the bending level which corresponds to the checked level. In an exemplary embodiment, the bending level may be expressed by using one or both of a bending angle and a bending strength.

If the bending level increases as shown in FIG. 8, the difference between the resistance value outputted from the location a5 of the bending sensor 41 and the resistance value outputted from the location a4 is greater than an existing resistance value difference. Therefore, the controller 130 determines that the bending level has increased.

As described above, a bending direction of the flexible display apparatus 100 may be changed to a Z+ direction or a Z− direction.

As described above, a feedback effect which occurs based on a bending move control may vary based on a bending angle which is determined based on when the bending move control starts and ends.

Figure 9:
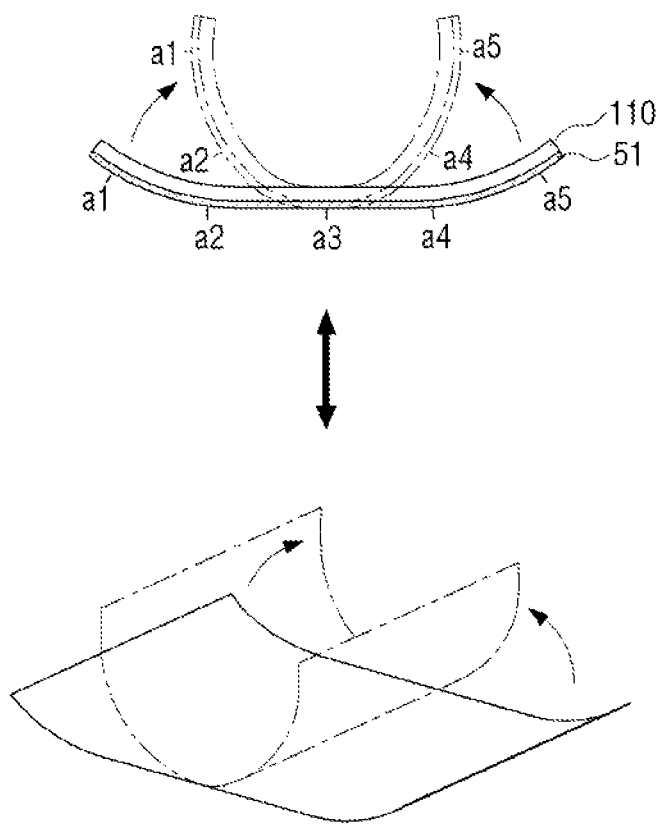

FIG. 9 is a view which illustrates a method for determining a bending level according to an exemplary embodiment.

As shown in FIG. 9, the bending level is determined by using corresponding changes of a bending radius R as determined by a bending sensor 51. A magnitude of the bending radius R may be determined by calculating a respective difference between corresponding resistance values of each bending sensor as shown in FIG. 8, and thus a detailed description thereof will be omitted.

A feedback effect which occurs based on a bending move control may vary based on the magnitude of the bending radius R as described above.

A bending direction may also be sensed by using one or more of various methods. For example, two bend sensors may overlap with each other to determine a bending direction based on a difference between changes of magnitudes of respective resistance values of the two bend sensors. A method for sensing a bending direction by using overlapping bend sensors will be described with reference to FIGS. 10 and 11.

Figure 10:
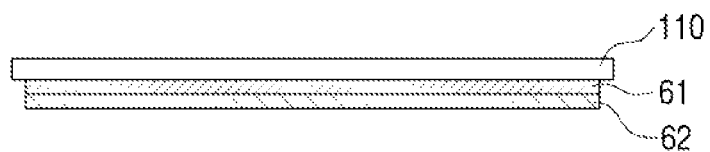
FIGS. 10 and 11 are views which illustrate a method for determining a bending level, according to another exemplary embodiment.

Referring to FIG. 10, two bend sensors 61 and 62 overlap with each other on a side of the display device 110. In this case, if bending occurs in one direction, respective resistance values of the bend sensors 61 and 62 are independently detected at a location at which the bending has occurred.

Therefore, the respective resistance values of the bend sensors 61 and 62 detected at the location are compared with each other to determine a bending direction.

Figure 11:
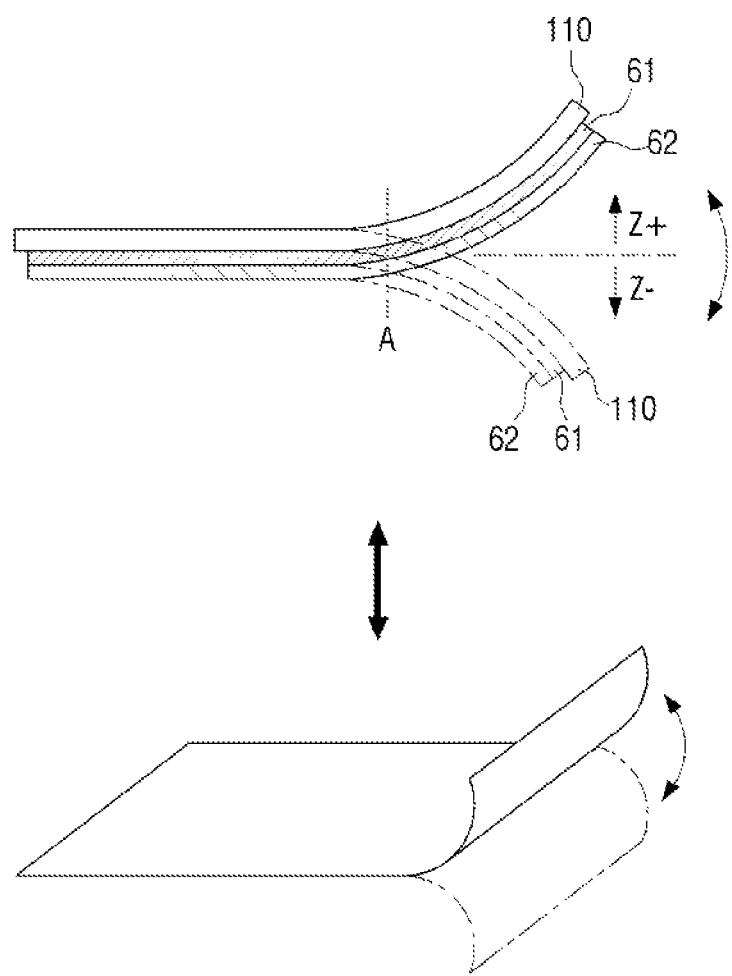

In particular, if the flexible display apparatus 100 is bent in a Z+ direction as shown in FIG. 11, a stronger tension is applied to the bend sensor 62 than the bend sensor 61 at location A corresponding to a bending line.

If the flexible display apparatus 100 is bent toward a back surface thereof, a stronger tension is applied to the bend sensor 61 than the bend sensor 62.

Therefore, the controller 130 compares respective resistance values of the bend sensors 61 and 62 corresponding to the location A to sense the bending direction.

Two bend sensors overlap with each other on the side of the display device 110 in the exemplary embodiment illustrated in FIGS. 10 and 11, but the two bend sensors may alternatively be disposed on both sides of the display device 110, i.e., one of the two bend sensors may be disposed on a first side of the display device 110, and the other of the two bend sensors may be disposed on an opposite side of the display device 110.

Figure 12:
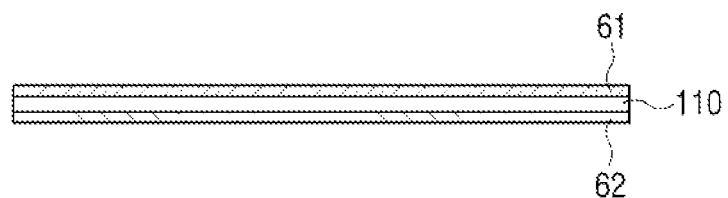
FIG. 12 is a view which illustrates an arrangement of a bend sensor, according to an exemplary embodiment.

FIG. 12 is a view which illustrates the bend sensors 61 and 62 as being disposed on both sides of the display device 110.

Therefore, when the flexible display apparatus 100 is bent in a first direction (hereinafter referred to as a Z+ direction) which is perpendicular to the screen, a bend sensor disposed on a first side of the display device 110 receives a compressive force, and a bend sensor disposed on a second side of the display device 110 receives a tension. When the flexible display apparatus 100 is bent in a second direction (hereinafter referred to as a Z− direction) opposite to the first direction, the bend sensor disposed on the second side of the display device 110 receives a compressive force, and the bend sensor disposed on the first side of the display device 110 receives a tension. As described above, values sensed from two bend sensors are independently detected based on bending directions, and the controller 130 distinguishes bending directions based on detection characteristics relating to the sensed values.

Bending directions are sensed by using two bend sensors in FIGS. 10 through 12 but may be distinguished by using a strain gauge disposed on one side of the display device 110. In particular, a compressive force or a tensile force is applied to the strain gauge disposed on the one side, based on a bending direction. Therefore, an output value thereof is checked to determine a bending direction.

Figure 13:
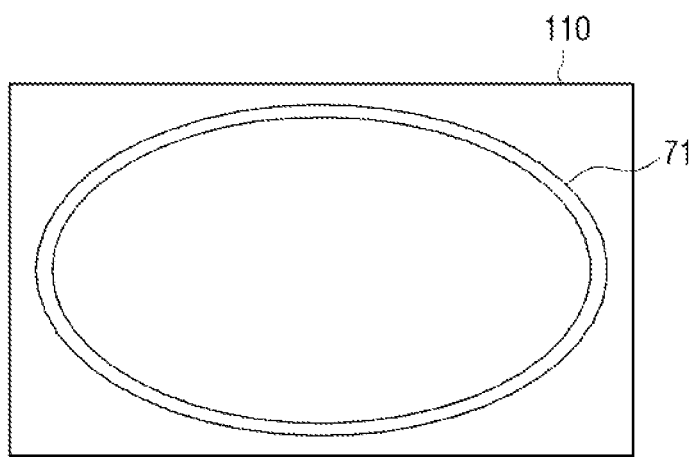
FIGS. 13, 14, 15, and 16 are views which illustrate a method for sensing bending, according to another exemplary embodiment.

FIG. 13 is a view which illustrates a bend sensor disposed on one side of the display device 110 to sense bending, according to an exemplary embodiment. Referring to FIG. 13, a bend sensor 71 is realized in a closed curve which forms a circle, an ellipse, a square, or a polygon, and is disposed at an edge of the display unit 110. The controller 130 determines a location of the closed curve, from which a change of an output value is sensed as a bending area. Alternatively, the bend sensor 71 may be combined with the display device 110 in an opened curve form such as, for example, an S shape, a Z shape, or a zigzag shape.

Figure 14:
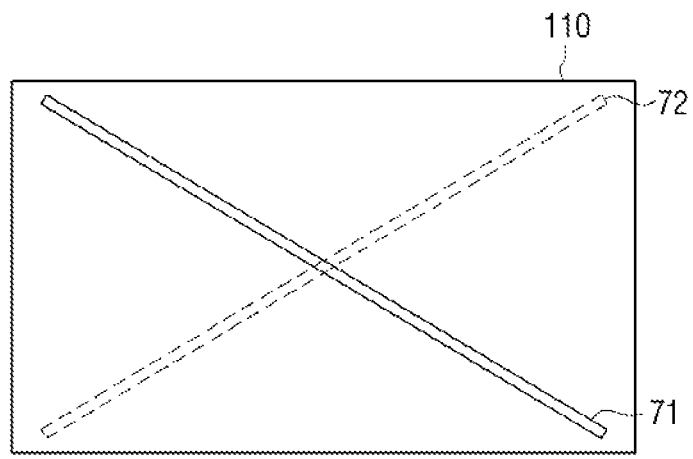

FIG. 14 is a view which illustrates two bend sensors which intersect with each other according to an exemplary embodiment. Referring to FIG. 14, a first bend sensor 71 is disposed on the first side of the display device 110, and a second bend sensor 72 is disposed on the second side of the display device 110. The first bend sensor 71 is disposed in a first diagonal direction with respect to the rectangular shape of the display device 110, and the second bend sensor 72 is disposed in a second diagonal direction with respect to the rectangular shape of the display device 110. Therefore, output values and output places of the first and second bend sensors 71 and 72 vary based on various bending conditions such as cases where corner areas of the display device 110 are bent, edge areas of the display device 110 are bent, a central part of the display unit 110 is bent, and/or folding or rolling occurs. As a result, the controller 130 determines a bending type based on respective output value characteristics sensed by the bend sensors 71 and 72.

Line-shaped bend sensors are used in the above-described various exemplary embodiments. However, a plurality of fragmental strain gauges may be used to sense bending.

Figure 15:
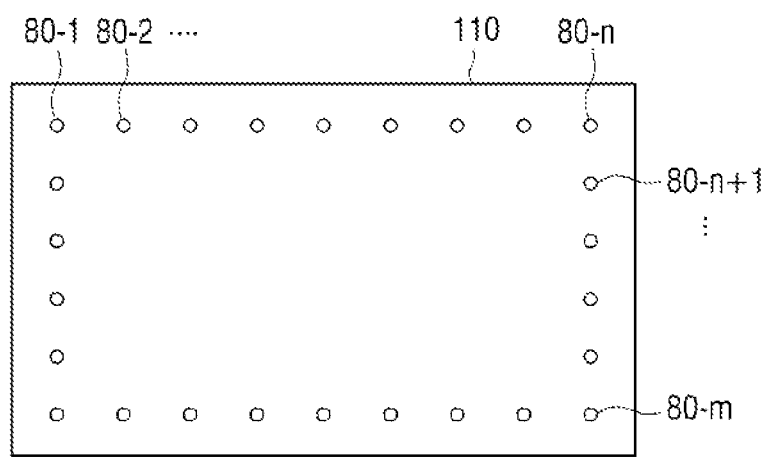

FIG. 15 is a view which illustrates a method for sensing bending by using a plurality of strain gauges according to an exemplary embodiment. The strain gauges sense a deformation of a surface of an object to be measured based on respective changes of a resistance value by using a metal or a semiconductor whose resistance varies based on a corresponding strength of an applied force. In general, a material such as metal has a characteristic by which a respective resistance value increases as a result of a corresponding increase in a length caused by an external force, but the respective resistance value also decreases in conjunction with a corresponding decrease in the length. Therefore, variations of a resistance value are sensed to determine whether bending has occurred.

Referring to FIG. 15, a plurality of strain gauges 80-1, 80-2, ... are disposed in an edge area of the display device 110. The number of strain gauges may vary based on a size, a shape, a preset bending sensing resolution, and/or any other relevant physical characteristic of the display device 110.

When the strain gauges are disposed as shown in FIG. 15, a user may bend the display device 110 at an arbitrary place in an arbitrary direction. In particular, if a corner area is bent, a force is applied to a strain gauge overlapping with a bending line from among strain gauges 80-1 through 80-n which are disposed in a horizontal direction along a top edge portion of the display device 110. Therefore, an output value of the corresponding strain gauge is greater than respective output values of the other strain gauges. Further, a force is applied to a strain gauge overlapping with the bending line among strain gauges 80-n, 80-n+1, ..., and 80-m which are disposed in a vertical direction along a right edge portion of the display device 110, and thus an output value thereof varies accordingly. The controller 130 determines a line which connects the two strain gauges whose output values have been changed, as the bending line.

Alternatively, differently than described above with reference to FIGS. 11 through 15, the flexible display apparatus 100 may sense a bending direction by using various sensors such as, for example, a Gyro sensor, a geomagnetic sensor, an acceleration sensor, and/or any other usable type of sensor.

Figure 16:
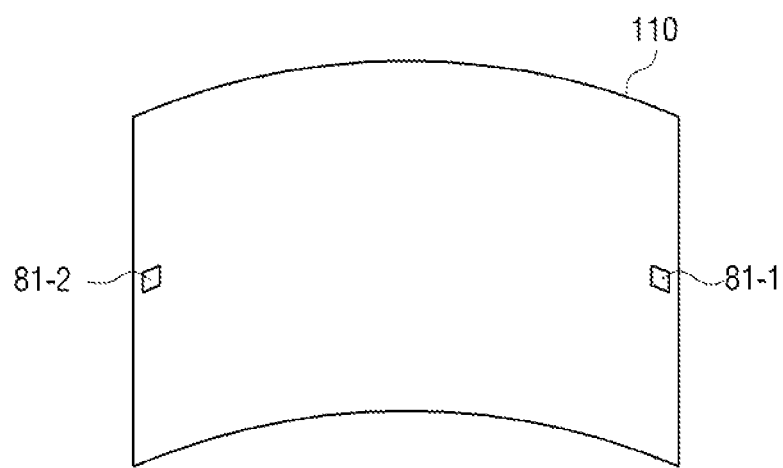

FIG. 16 is a view which illustrates a method for sensing a bending direction by using an acceleration sensor according to an exemplary embodiment. Referring to FIG. 16, the flexible display apparatus 100 includes a plurality of acceleration sensors 81-1 and 81-2.

The acceleration sensors 81-1 and 81-2 are sensors which measure an acceleration and a direction of the acceleration when a move occurs. In particular, each of the acceleration sensors 81-1 and 81-2 outputs a respective sensing value which corresponds to an acceleration of gravity which changes based on a gradient of an apparatus upon which the acceleration sensors 81-1 and 81-2 operate. Therefore, if the acceleration sensors 81-1 and 81-2 are disposed in two respective edge areas of the flexible display apparatus 100, output values sensed by the acceleration sensors 81-1 and 81-2 when the flexible display apparatus 100 is bent vary. The controller 130 calculates a pitch angle and a roll angle by using the respective output values sensed by the acceleration sensors 81-1 and 81-2. Therefore, the controller 130 determines a bending direction based on change degrees of the pitch angle and the roll angle sensed by the acceleration sensors 81-1 and 81-2.

In FIG. 16, the acceleration sensors 81-1 and 81-2 are respectively disposed on both sides of a horizontal direction of the flexible display apparatus 100 based on a front surface of the flexible display apparatus 100. Alternatively, the acceleration sensors 81-1 and 81-2 may be disposed in a vertical direction with respect to one another. If the flexible display apparatus 100 is bent in the vertical direction in this case, a bending direction may be sensed based on respective measurement values sensed by the acceleration sensors 81-1 and 81-2 which are disposed in the vertical direction.

According to another exemplary embodiment, acceleration sensors may be disposed in any one of more of an upper edge area, a lower edge area, a left edge area, a right edge area, and corner areas.

As described above, a bending direction may be sensed by using a Gyro sensor or a geomagnetic sensor instead of an acceleration sensor. If a rotary motion occurs, a Gyro sensor measures a Coriolis force which operates in a speed direction of the rotary motion to detect an angular speed. A rotation direction may be detected based on the value of the measurement performed by the Gyro sensor, and thus a bending direction may be sensed. The geomagnetic sensor senses an azimuth by using a biaxial or triaxial flux gate. If geomagnetic sensors are used, respective positions of the geomagnetic sensors which are disposed at edges of the flexible display apparatus 100 are moved if the edges of the flexible display apparatus 100 are bent. Therefore, the respective geomagnetic sensors output electrical signals which are based on respective geomagnetic changes caused by the corresponding position movements. The controller 130 may calculate a yaw angle by using respective values outputted from the geomagnetic sensors. Therefore, various bending characteristics, such as a bending area, a bending direction, and/or any other relevant bending characteristic, may be determined according to corresponding changes of the calculated yaw angle.

As described above, the flexible display apparatus 100 may sense bending by using various types of sensors. Structures of sensors and sensing methods described above may be separately applied to the flexible display apparatus 100 or may be combined with one another to be applied to the flexible display apparatus 100.

The sensor 120 may sense a user control of touching the screen of the display device 110, in addition to sensing bending.

In particular, the sensor 120 may sense a touch by using a capacitive overlay method, a resistive overlay method, an infrared beam method, a surface acoustic wave method, an integral strain gauge method, a piezoelectric method, or the like.

In particular, the capacitive overlay method refers to a method for sensing a capacitive change when fingers contact, in order to sense a position.

The resistive overlay method refers to a method by which a resistance value varies due to a contact between upper and lower surfaces caused by a pressing operation, a voltage also varies due to a current flowing in both ends, and a contact position is sensed based on the change of the voltage.

The infrared beam method refers to a method for blocking light emitted from an infrared light-emitting diode (LED) when touching a screen of a monitor having an Optp-Matrix frame with an object capable of blocking the light, such as, for example, a finger, in order to prevent an opposite photo transistor from sensing the light and thereby to sense a position.

The surface acoustic wave method refers to a method which is realized as a simple principle of using a characteristic of ultrasonic waves which are propagated along a surface and a characteristic of a sound which propagates at predetermined time intervals in order to sense time intervals of a sound reflected and received by using a transmitter and a reflector.

The integral strain gauge method refers to a method by which if a corner is pressed with a hand, and a strain gauge which is disposed at the pressed corner receives a strongest force as compared with respective forces received by corresponding strain gauges which are disposed at the other three corners, the received strongest force is converted to an electrical signal based on a level of an increasing force, and the electrical signal is then transmitted to a controller. In particular, the controller calculates a ratio of respective electrical signals relating to each of the four corners to calculate a coordinate value.

The piezoelectric method refers to a method by which when a user touches four corners, the four corners receive different respective pressures based on respective levels of the pressures and their respective positions, and corresponding electrical signals relating to each of the four corners are calculated to check a touch position.

For example, the sensor 120 may include a transparent conductive layer, such as, for example, a layer which includes ITO, which is deposited on the substrate 111 of the display device 110, and a film which is formed on the transparent conductive layer. Therefore, if a user touches the screen, upper and lower panels of a touched location on the screen contact each other, and thus an electrical signal is transmitted to the controller 130. The controller 130 senses the touched location by using a coordinate of an electrode to which the electrical signal has been transmitted. The touch sensing method is well known in various referential documents, and thus a detailed description thereof will be omitted herein.

If a bending move control is sensed, the controller 130 may change and display a state of the screen.

Further, if a preset event of the bending move control occurs, the controller 130 may also execute a preset function. For example, if a preset event of maintaining a bending state for a preset time or more occurs when a content displayed in a bending area is expanded and displayed based on a bending move control, the controller 130 may execute the corresponding content.

A method for changing a state of a screen based on a bending move control, according to various exemplary embodiments, will now be described in detail.

Figure 17:
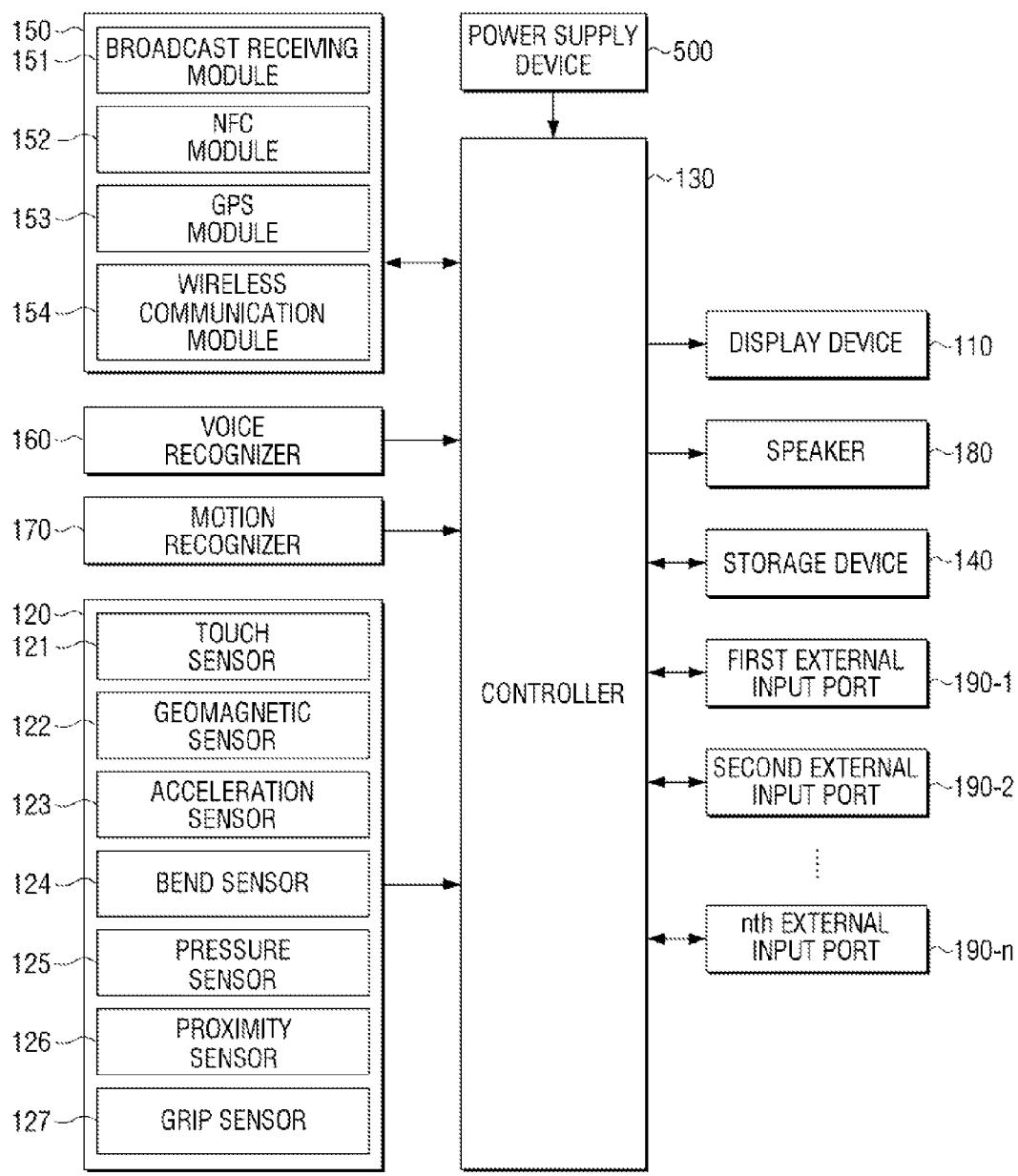
FIG. 17 is a block diagram which illustrates a detailed structure of a flexible display apparatus for describing operations according to various exemplary embodiments.

FIG. 17 is a block diagram which illustrates a detailed structure of the flexible display apparatus 100 for describing operations according to various exemplary embodiments.

Referring to FIG. 17, the flexible display apparatus 100 includes a display device 110, a sensor 120, a controller 130, a storage device 140, a communicator 150, a voice recognizer 160, a motion recognizer 170, a speaker 180, external input ports 190-1, 190-2 . . . , 190-n, and a power supply 500.

The display device 110 has a flexible characteristic. Detailed structure and operation of the display device 110 are as described above, and thus their repeated descriptions will be omitted.

The storage device 140 stores various types of programs or data related to an operation of the flexible display apparatus 100, such as, for example, setting information set by a user, system operating software, various types of application programs, feedback effects respectively corresponding to parameters constituting a bending move control, and/or any other relevant data or information. In particular, the parameters may include a position of a bending area (or a bending line) defining a bending move state as described above, a bending direction, a bending angle, a bending radius, and/or any other relevant parameters.

The sensor 120 senses a user control in which occurs with respect to the flexible display apparatus 100 including the display device 110, in particular, a bending move control. Referring to FIG. 17, the sensor 120 includes a touch sensor 121, a geomagnetic sensor 122, an acceleration sensor 123, a bend sensor 124, a pressure sensor 125, a proximity sensor 126, and a grip sensor 127.

The touch sensor 121 may be realized as a capacitive or resistive touch sensor. The capacitive touch sensor senses micro-electricity excited into the body of a user when a part of the body of the user touches a surface of the display device 110, by using a dielectric which is coated on the surface of the display device 110 in order to calculate a touch coordinate. The resistive touch sensor includes two electrodes of a remote control apparatus which sense that a current flows due to a contact between upper and lower panels of a location touched by the user in order to calculate a touch coordinate. In addition, one or more of an infrared beam method, a surface acoustic wave method, an integral strain gauge method, a piezoelectric method, or the like may be used to sense a touch control.

The infrared beam method refers to a method for blocking light emitted from an infrared LED when touching a screen of a monitor having an Optp-Matrix frame with an object capable of blocking the light, such as, for example, a finger, in order to prevent an opposite photo transistor from sensing the light and thereby to sense a position.

The surface acoustic wave method refers to a method which is realized as a simple principle of using a characteristic of ultrasonic waves which are propagated along a surface and a characteristic of a sound which propagates at predetermined time intervals in order to sense time intervals of a sound reflected and received by using a transmitter and a reflector.

The integral strain gauge method refers to a method by which if a corner is pressed with a hand, and a strain gauge which is disposed at the pressed corner receives a strongest force as compared with respective forces received by corresponding strain gauges which are disposed at the other three corners, the received strongest force is converted to an electrical signal based on a level of an increasing force, and the electrical signal is then transmitted to a controller. In particular, the controller calculates a ratio of respective electrical signals relating to each of the four corners to check a touch position.

The piezoelectric method refers to a method by which when a user touches four corners, the four corners receive different respective pressures based on respective levels of the pressures and their respective positions, and corresponding electrical signals relating to each of the four corners are calculated to check a coordinate value.

As described above, the touch sensor 121 may be realized as various types.

The geomagnetic sensor 122 senses a rotation state and a move direction of the flexible display apparatus 100, and the acceleration sensor 123 senses a gradient of the flexible display apparatus 100. As described above, the geomagnetic sensor 122 and the acceleration sensor 123 may be respectively used to detect bending characteristics, such as a bending direction or a bending area of the flexible display apparatus 100, or may be used to detect a rotation state or a gradient state of the flexible display apparatus 100.

The bend sensor 124 may be realized as various types and various numbers as described above to sense a bending state of the flexible display apparatus 100. Various exemplary embodiments of a structure and an operation of the bend sensor 124 are as described above, and thus their repeated descriptions will be omitted herein.

When the user performs a touch or bending control, the pressure sensor 125 senses a strength of pressure applied to the flexible display apparatus 100 and transmits the sensed strength of the pressure to the controller 130. The pressure sensor 125 may include a piezoelectric film which is installed in the display device 110 in order to output an electrical signal corresponding to the strength of the pressure. In FIG. 17, the pressure sensor 125 is installed separately from the touch sensor 121. However, if the touch sensor 121 is realized as a resistive touch sensor, the resistive touch sensor may perform a role of the pressure sensor 150.

The proximity sensor 126 senses a motion which approaches a display surface without directly contacting the display surface. The proximity sensor 126 may be realized as various types of sensors, such as, for example, a high-frequency oscillation type proximity sensor which forms a high frequency magnetic field in order to sense a current induced by a magnetic field characteristic changing when an object approaches, a magnetic type sensor which uses a magnet, a capacitive sensor which senses a capacitance changing due to an approach of an object, and/or any other relevant type of device which is capable of sensing proximity.

The grip sensor 127 is disposed at an edge or a handle of the flexible display apparatus 100 separately from the pressure sensor 125 in order to sense a grip of the user. The grip sensor 127 may be realized, for example, as a pressure sensor or a touch sensor.

The controller 130 analyzes various types of sensing signals sensed by the sensor 120 in order to provide a feedback effect which corresponds to a bending move control if it is determined that the bending move control has occurred. In particular, the feedback effect may include at least one of a zoom-in/zoom-out effect, a highlight effect, a 3D navigation effect, a content execution effect, and a detailed content display effect.

In particular, if a bending area is formed when a grip control of the flexible display apparatus 100 is sensed, and the bending area continuously moves to a peripheral direction, the controller 130 determines that the bending move control has occurred. More particularly, the controller 130 determines the bending move control based on a bending state change when the grip control is sensed, to distinguish the bending state change from a bending state change which is not intended by the user.

As an example of an operation performed by the controller 130, the controller 130 may perform an operation of processing data which is obtained via a communication with an external apparatus or data which is stored in the storage device 140 in order to output the processed data via the display device 110 and/or the speaker 180. In this case, the controller 130 may communicate with the external apparatus by using the communicator 150.

The communicator 150 is an element or a device which communicates with various types of external apparatuses according to various types of communication methods. The communicator 150 includes various types of communication modules, such as a broadcast receiving module 151, a near field communication (NFC) module 152, a global positioning system (GPS) module 153, a wireless communication module 154, and/or any other relevant type of communication module. In particular, the broadcast receiving module 151 may include a terrestrial broadcast receiving module (not shown) which includes an antenna for receiving a terrestrial broadcast signal, a demodulator, an equalizer, a digital multimedia broadcasting (DMB) module which receives and processes a DMB broadcast signal, and/or any other relevant type of broadcast receiver. The NFC module 152 communicates with an external apparatus which is positioned in a near field in accordance with NFC communication methods such as, for example, an NFC method, a Bluetooth method, a Zigbee method, and/or any other relevant type of communication method. The GPS module 153 receives a GPS signal from a GPS satellite to detect a current position of the flexible display apparatus 100. The wireless communication module 154 is connected to an external network in order to communicate with the external network in accordance with a wireless communication protocol such as WiFi, IEE, or the like. The communication module 152 may further include a mobile communication module which accesses a mobile communication network in order to communicate with the mobile communication network in accordance with any one or more of various mobile communication standards such as 3rd Generation (3G), 3rd Generation Partnership Projection (3GPP), Long Term Evolution (LTE), and/or any other relevant standard.

The controller 130 controls to transmit a content displayed on the display device 110 based on the bending move control which is provided via the communicator 150 to the external apparatus.

In this case, if the content is transmitted to the external apparatus, the controller 130 controls to cause the corresponding content to disappear from a screen.

The controller 130 recognizes a received voice input or a received motion input, in addition to a bending control or a touch control, in order to perform an operation corresponding to the received voice input or the received motion input. In this case, the controller 130 enables the voice recognizer 160 or the motion recognizer 170.

The voice recognizer 160 collects a voice input received from the user or an external sound by using a voice acquiring means such as a microphone (not shown) and transmits the voice input or the external sound to the controller 130. If the flexible display apparatus 100 operates in a voice control mode, and the voice input received from the user matches with a preset voice command, the controller 130 performs a task corresponding to the received voice input.

The motion recognizer 170 acquires an image relating to the user by using an image pickup means (not shown) such as a camera and provides the acquired image to the controller 130. If the flexible display apparatus 100 operates in a motion control mode, the controller 130 analyzes the acquired image to determine whether the user has made a motion gesture corresponding to a preset motion command and, if it is determined that the user has made such a motion gesture, performs an operation corresponding to the preset motion command.

For example, various tasks, such as channel zapping, apparatus turning on, turning off, pausing, playing, stopping, rewinding, fast-forwarding, muting, and/or any other relevant task, may be controlled in accordance with a received voice input or a received motion input but are not limited thereto.

The first, second, . . . , and $n^{th}$ external input ports 190-1, 190-2, . . . , 190-$n$ are respectively connected to various types of external apparatuses in order to receive various types of data or programs, control commands, and/or other types of inputs. In particular, each of the first, second, . . . , and $n^{th}$ external input ports 190-1, 190-2, . . . , 190-$n$ may include a universal serial bus (USB) port, a headset port, a mouse port, a local area network (LAN) port, and/or any other relevant type of input port. The power supply 500 is an element which supplies power to elements of the flexible display apparatus 100. The power supply 500 may be realized to include any one or more of an anode current collector, an anode, an electrolyte part, a cathode, a cathode current collector, and a coating part coating the cathode current collector. The power supply 500 may be realized as a secondary battery which may be charged and discharged. The power supply 500 may be realized in a flexible shape to be bent in conjunction with the flexible display apparatus 100. In this case, a current collector, an electrode, an electrolyte, coating, and/or any other component part of the power supply 500 may be formed from respective materials having flexible characteristics. Details relating to a shape and a material of the power supply 500 will be described below.

In FIG. 17, various types of elements are included in the flexible display apparatus 100. However, the flexible display apparatus 100 may not necessarily include all of the elements and is not limited to these elements. In particular, some of the elements may be omitted or added or may be replaced with other elements in accordance with a product type relating to the flexible display apparatus 100.

The controller 130 controls the elements based on a user control sensed by the sensor 120 and/or by the voice recognizer 160 in order to perform various operations.

Figure 18:
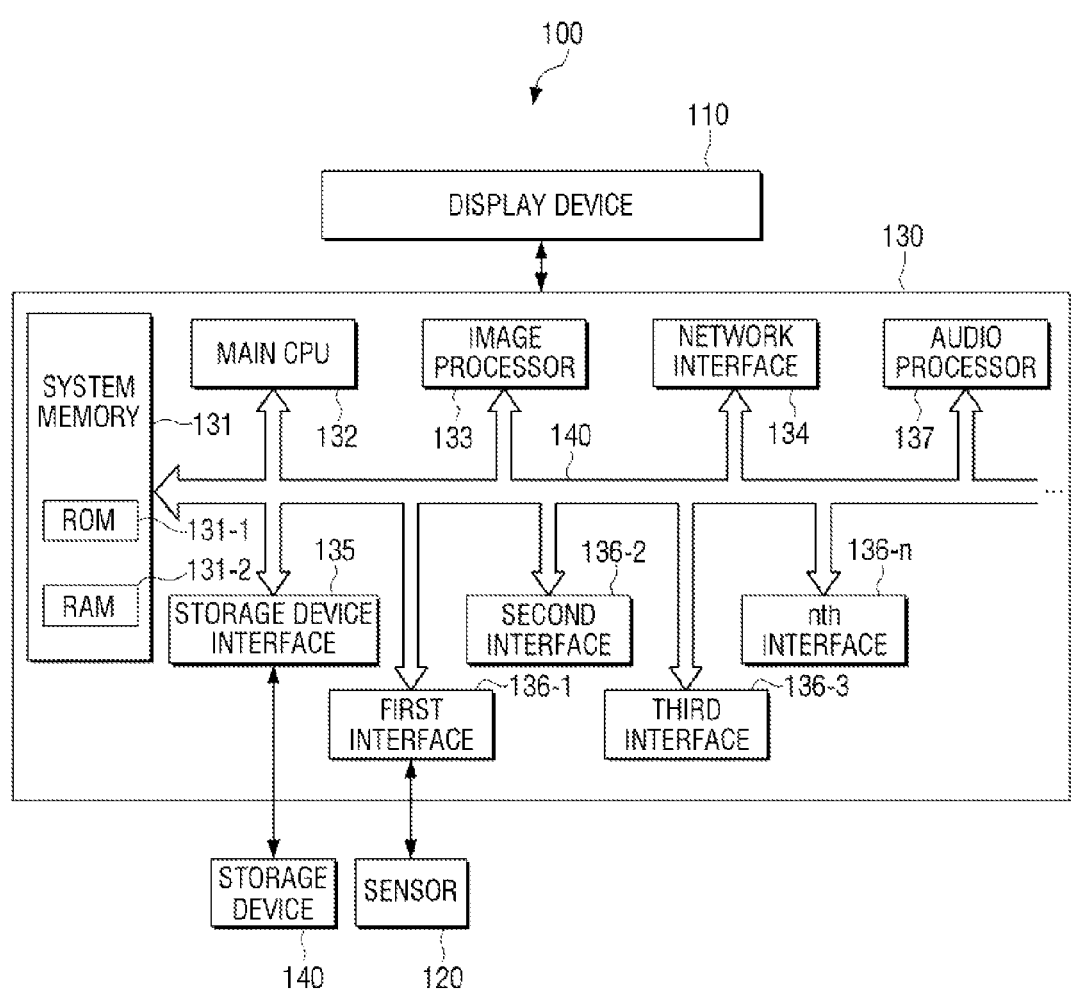
FIG. 18 is a block diagram which illustrates a detailed structure of a controller of FIG. 17.

FIG. 18 is a block diagram which illustrates a detailed structure of the controller 130 of FIG. 17.

Referring to FIG. 18, the controller 130 includes a system memory 131, a main central processing unit (CPU) 132, an image processor 133, a network interface 134, a storage device interface 135, first through $n^{th}$ interfaces 136-1, 136-2, 136-3, . . . , 136-$n$, an audio processor 137, and a system bus 140.

The system memory 131, the main central processing unit (CPU) 132, the image processor 133, the network interface 134, the storage device interface 135, the first through $n^{th}$ interfaces 136-1 through 136-$n$, and the audio processor 137 are connected to one another via the system bus 140 in order to receive and transmit various types of data or signals.

The first through $n^{th}$ interfaces 136-1 through 136-$n$ support interfacing between various types of elements, including the sensor 120 and elements of the controller 130. In FIG. 18, the sensor 120 is connected only to the first interface 136-1. However, if the sensor 120 includes a plurality of various types of sensors, such as those shown in FIG. 17, the sensor 120 may be connected to each of the sensors via a respective interface. Further, at least one of the first through $n^{th}$ interfaces 136-1 through 136-$n$ may be realized as an input interface which receives various types of signals from a button installed on a body part of the flexible display apparatus 100 or an external apparatus connected via a respective one of the first through $n^{th}$ external input ports.

The system memory 131 includes a read only memory (ROM) 131-1 and a random access memory (RAM) 131-2. The ROM 131-1 stores a command set for system booting, and/or any other relevant types of system commands. If a turn-on command is received in order to cause power to be supplied, the main CPU 132 copies an operating system (O /S) which is stored in the storage device 140 into the RAM 131-2 based on a command stored in the ROM 131-1. If booting is completed, the main CPU 132 copies various types of application programs which are stored in the storage device 140 into the RAM 131-2 and executes the application programs copied into the RAM 131-2 in order to perform various operations.

As described above, the main CPU 132 may perform various operations in accordance with executions of applications which are stored in the storage device 140.

The storage device interface 135 is connected to the storage device 140 in order to receive and transmit various types of programs, contents, data, and any other relevant type of content which is stored in the storage device 140.

For example, if the user performs a bending move control which corresponds to a play command for playing and displaying contents stored in the storage device 140, the main CPU 132 accesses the storage device 140 via the storage device interface 135 in order to generate a list of the stored contents, and displays the list on the display device 110. If the user performs the bending move control in order to select one content in this state, the main CPU 132 executes a content play program which is stored in the storage device 140. The main CPU 132 controls the image processor 133 based on a command included in the content play program in order to constitute a content play screen.

The image processor 133 may include one or more of a decoder, a renderer, a scaler, and/or any other relevant type of component or module which is configured for performing an image processing function. Therefore, the image processor 133 decodes the stored content, renders the decoded content data in order to form a frame, and scales a size of the frame to a screen size of the display device 110. The image processor 133 provides the processed frame to the display device 110 in order to display the frame.

The audio processor 137 is an element which processes audio data and provides the processed audio data to a sound output means, such as, for example, the speaker 180. The audio processor 137 may perform audio signal processing in order to decode audio data stored in the storage device 140 or audio data received via the communicator 150, filter the audio data off noise, and amplify the audio data to an appropriate decibel level. In the above-described example, if a played content includes a moving picture content, the audio processor 137 may process audio data which is demultiplexed from the moving picture content and provide the processed audio data to the speaker 180 in order to synchronize the audio data with the image processor 133 and then output the synchronized audio data.

The network interface 134 is connected to respective external apparatuses via a network. For example, if a web browser program is executed, the main CPU 132 accesses a web server via the network interface 134. If webpage data is received from the web server, the main CPU 132 controls the image processor 133 to form a webpage screen and to display the webpage screen on the display device 110.

As described above, if a bending control is sensed from the flexible display apparatus 100, the controller 130 determines whether the sensed bending control is a bending move control. If it is determined that the sensed bending control is the bending move control, the controller 130 reads feedback information relating to the bending move control from the storage device 140 and performs an operation corresponding to the feedback information. The above-described operation of the controller 130 may be realized by executions of various programs stored in the storage device 140.

Figure 19:
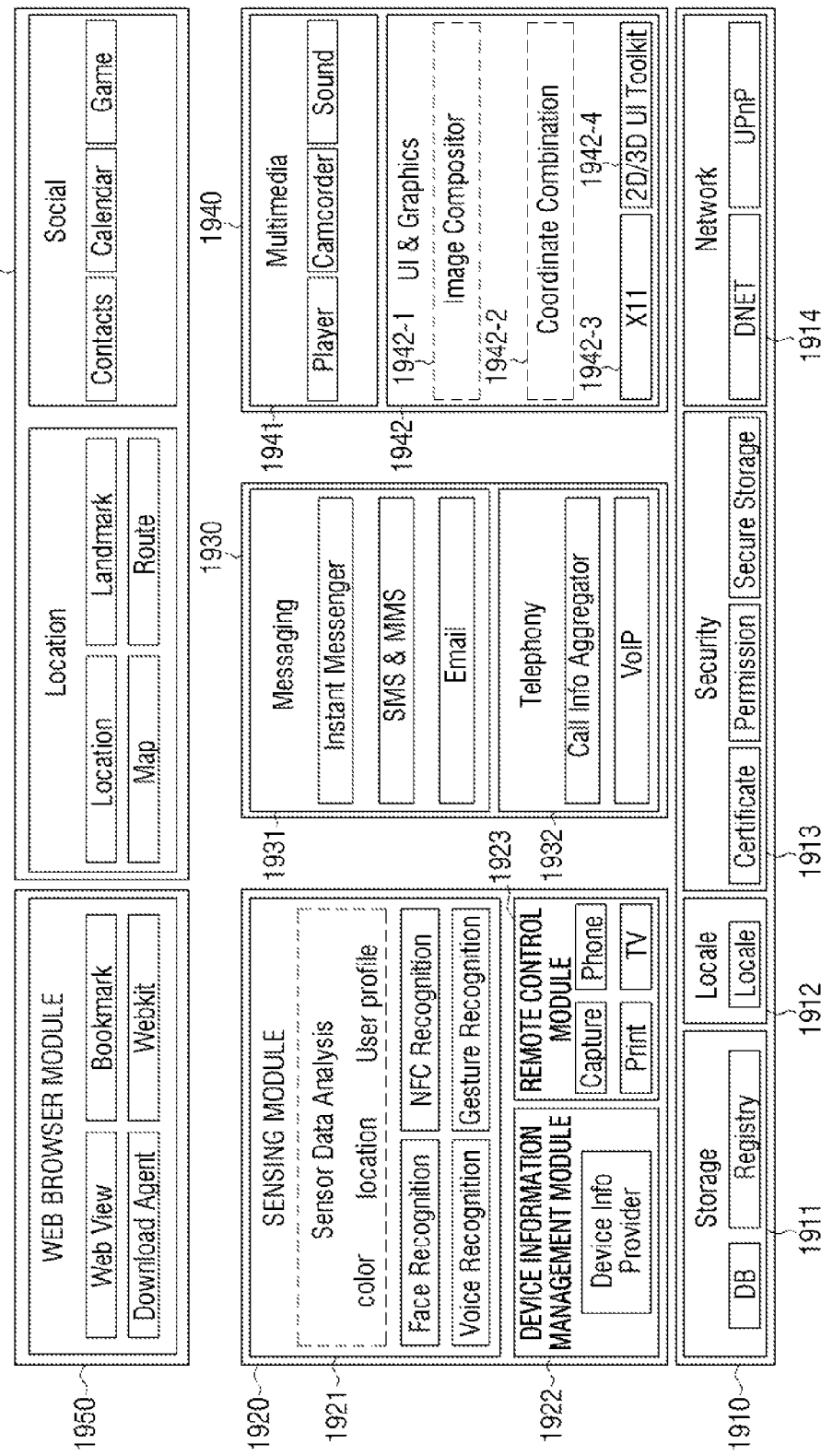
FIG. 19 is a view which illustrates a software structure of a storage device for supporting an operation of a controller, according to various exemplary embodiments.

FIG. 19 is a view which illustrates a software structure of the storage device 140 for supporting the operations of the controller 130 according to the above-described various exemplary embodiments. Referring to FIG. 19, the storage device 140 includes a base module 1910, a device management module 1920, a communication module 1930, a presentation module 1940, a web browser module 1950, and a service module 1960. Each of the base module 1910, the device management module 1920, the communication module 1930, the presentation module 1940, the web browser module 1950, and the service module 1960 may be implemented as a hardware device or component such as an integrated circuit or dedicated circuitry, a software module configured to perform the corresponding functions, or a combination of hardware and software, such as a microprocessor which executes software programs stored in a memory.

The base module 1910 processes signals transmitted from software included in the flexible display apparatus 100 and transmits the processed signals to an upper layer module.

The base module 1910 includes a storage module 1911, a location-based module 1912, a security module 1913, a network module 1914, and/or any other relevant type of component used for processing received signals.

The storage module 1911 is a program module which manages a database (DB) or a registry. The location-based module 1912 is a program module which operates in conjunction with hardware such as a GPS chip in order to support a location-based service. The security module 1913 is a program module which supports a certification, a permission, a secure storage, and/or any other relevant security-related function for the hardware. The network module 1914 includes a DNET module, UPnP module, and/or any other relevant type of network connection component as modules for supporting a network connection.

The device management module 1920 manages and uses information relating to one or more of an external input and an external device. The device management module 1920 includes a sensing module 1921, a device information management module 1922, and a remote control module 1923.

The sensing module 1921 analyzes sensor data provided from various types of sensors of the sensor 120. In particular, the sensing module 1921 is a program module which performs an operation of detecting one or more of a location, a color, a shape, a size, and other profiles of an object or a user. The sensing module 1921 includes one or more of a face recognition module, a voice recognition module, a motion recognition module, an NFC recognition module, and/or any other relevant type of component which performs a sensing function. The device information management module 1922 provides information relating to various types of devices. The remote control module 1923 is a program module which performs an operation of remotely controlling peripheral devices such as, for example, a telephone, a TV, a printer, a camera, an air conditioner, and/or any other relevant types of peripheral devices.

The communication module 1930 performs a communication with an external device. The communication module 1930 includes a messaging module 1931 which includes a messenger program, a Short Message Service (SMS) & Multimedia Message Service (MMS) program, and an e-mail program, and a telephony module 1932 which includes a Call Info Aggregator program module and a VoIP module.

The presentation module 1940 forms the display screen. The presentation module 1940 includes a multimedia module 1941 which is configured to play and output a multimedia content, and a user interface (UI) & graphics module 1942 which is configured to perform UI and graphics processing functions. The multimedia module 1941 includes a player module, a camcorder module, and a sound processing module. Therefore, the presentation module 1940 plays various types of multimedia contents in order to generate a screen and a sound and thereby to perform a play operation. The UI & graphics module 1942 includes an image compositor module 1942-1 which combines images, a coordinate combination module 1942-2 which combines coordinates on a screen in order to generate an image for display thereof, an X11 module 1942-3 which receives various types of events from hardware, and a 2D/3D UI toolkit 1942-4 which provides a tool for forming a 2D or 3D UI.

The web browser module 1950 performs web browsing in order to access a web server. The web browser module 1950 includes various types of modules such as a web view module which forms a webpage, a download agent module which performs downloading, a bookmark module, and a Webkit module.

The service module 1960 is an application module which provides various types of services. For example, the service module 1960 includes various types of modules such as a navigation service module which provides a map or a current location, a landmark, path information, and a social module which provides a game module, an advertisement application module, a contacts module, and a calendar module.

The main CPU 132 of the controller 130 accesses the storage device 140 via the storage device interface 135 in order to copy various types of modules which are stored in the storage device 140 into the RAM 131-2 and to enable performance of operations in accordance with corresponding operations of the copied modules.

In particular, the main CPU 132 analyzes output values provided by various types of sensors of the sensor 120 by using the sensing module 1921 to check a bending area, a bending line, a bending direction, the number of times of bending, a bending angle, a bending speed, a touch area, the number of times of touch, a touch strength, a pressure strength, a proximity degree, a user grip, and/or any other relevant parameters and to use a result of the check to determine whether a bending move control has occurred. If it is determined that the bending move control has occurred, the main CPU 132 detects information relating to an operation corresponding to the bending move control from the DB of the storage module 1910. Further, the main CPU 132 drives a module in correspondence with the detected information in order to perform an operation.

For example, if the operation is a graphic user interface (GUI) display operation, the main CPU 132 forms a GUI screen by using the image compositor module 1942-1 of the presentation module 1940. The main CPU 132 determines a display location of the GUI screen by using the coordinate combination module 1942-2 and controls the display device 110 to display the GUI screen in the display location.

Alternatively, if a user control which corresponds to a message receiving operation is performed, the main CPU 132 uses the messaging module 1941 to access a message management server and receives a message stored in a user account. The main CPU 132 also forms a screen which corresponds to the received message by using the presentation module 1940 and displays the screen on the display device 110.

If a telephoning operation is performed, the main CPU 132 drives the telephony module 1932.

As described above, the storage device 140 may store programs having various structures. The controller 130 may perform operations according to the above-described various exemplary embodiments by using various types of programs stored in the storage device 140.

Figure 20:
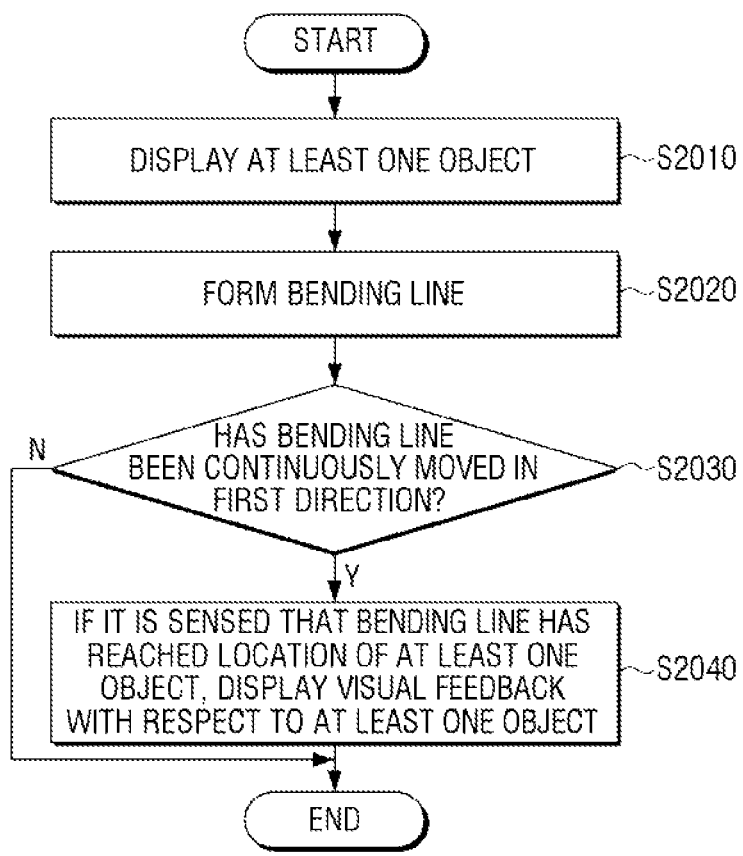
FIG. 20 is a flowchart which illustrates a method for controlling a flexible display apparatus, according to an exemplary embodiment.

FIG. 20 is a flowchart which illustrates a method for controlling a flexible display apparatus according to an exemplary embodiment.

Referring to FIG. 20, in operation S2010, at least one object is displayed.

In operation S2020, a bending line is formed on the flexible display apparatus. In operation S2030, a determination is made as to whether a bending move control of continuously moving the bending line in a first direction has occurred. In particular, a screen of the flexible display apparatus matches with a 2D coordinate system to calculate a coordinate value of the bending line. If the coordinate value of the bending line is continuously changed in the first direction, it is determined that the bending line has been continuously moved in the first direction If it is determined in operation S2030 that the bending moving control has occurred, in operation S2040, if the bending line reaches at least one object, a visual feedback is displayed with respect to the corresponding object. If it is determined in operation S2030 that the bending move control has not occurred, a current operation state is maintained or a function corresponding to the bending move control is performed.

In operation S2040, a first visual feedback may be displayed with respect to the at least one object which is different from a second visual feedback with respect to another object. In particular, the visual feedback may include at least one of a zoom-in/zoom-out effect, a highlight effect, a content execution effect, a lower menu display effect, and a detailed content display effect.

In operation S2040, at least one object displayed in a first bending line location may be moved to a second bending line location, which is formed by moving the first bending line, based on a move of the bending line, and the at least one object may displayed in the second bending line location.

If the at least one object displayed in the first bending line location is moved to the second bending line location and displayed at the second bending line location, a visual feedback caused by the move of the bending line may be provided to the at least one object.

In this case, different visual feedbacks may be provided based on at least one of a move speed of the bending line, a move direction of the bending line, and a move distance of the bending line.

If the at least one object displayed in the first bending line location is moved to the second bending line location and displayed at the second bending line location, the at least one object may be transmitted to an external apparatus which corresponds to the second bending line location.

In this case, if the at least one object is transmitted to the external apparatus, at least one object displayed in the second bending line location may disappear.

If the bending line is formed and is continuously moved in the first direction to reach a location of at least one object when a grip control is sensed in at least two preset areas of the flexible display apparatus, a visual feedback may be displayed with respect to the at least one object.

Various exemplary embodiments of changing a screen display state based on a bending move control will now be described.

Figure 21:
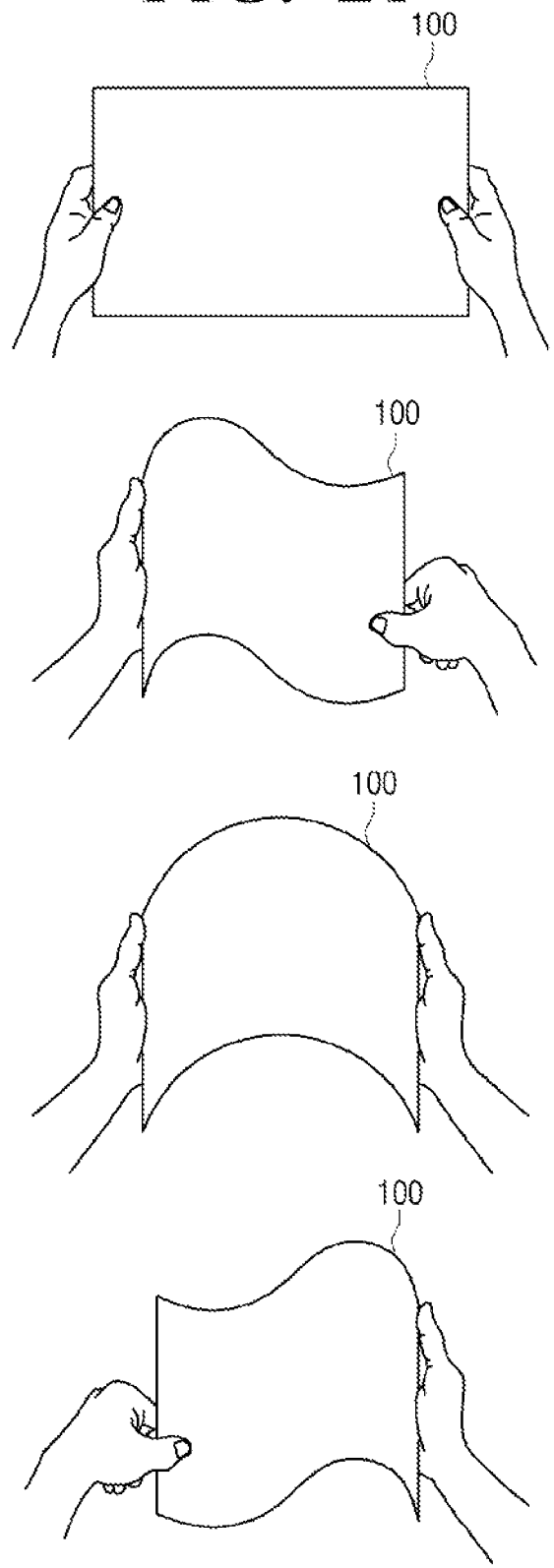
FIG. 21 is a view which illustrates bending move controls, according to an exemplary embodiment.

FIG. 21 is a view which illustrates a bending move control according to an exemplary embodiment.

As shown in FIG. 21, when the flexible display apparatus 100 is not bent, i.e., is in a flat state, a bending line is formed in a Z+ direction in a left area of the flexible display apparatus 100 based on a user control.

If the bending line which is formed in the Z+ direction in the left area based on the user control is continuously moved into an intermediate area of the left area located in the first direction and then is continuously moved to a left area of the intermediate area located in the first direction, it may be determined that a bending move control has occurred.

In particular, if a continuous move of the bending line is sensed when a grip control is sensed in the two preset areas, it may be determined that the bending move control has occurred. For example, as shown in FIG. 21, a user may grip both ends of left and right sides of the flexible display apparatus 100 to perform a control of moving the bending line.

In FIG. 21, the bending line is formed only in a part intended by the user in FIG. 21, but in an alternative exemplary embodiment, the bending line may be formed in a part which is not intended by the user based on a location and a strength of the grip of the user. For example, even if the bending line is moved into the intermediate area, bending lines may be formed at both ends based on the grip control. In particular, one inflection point is formed due to bending in FIG. 21. However, bending may be performed to form inflection points at both ends due to a grip operation of the user.

Figure 22:
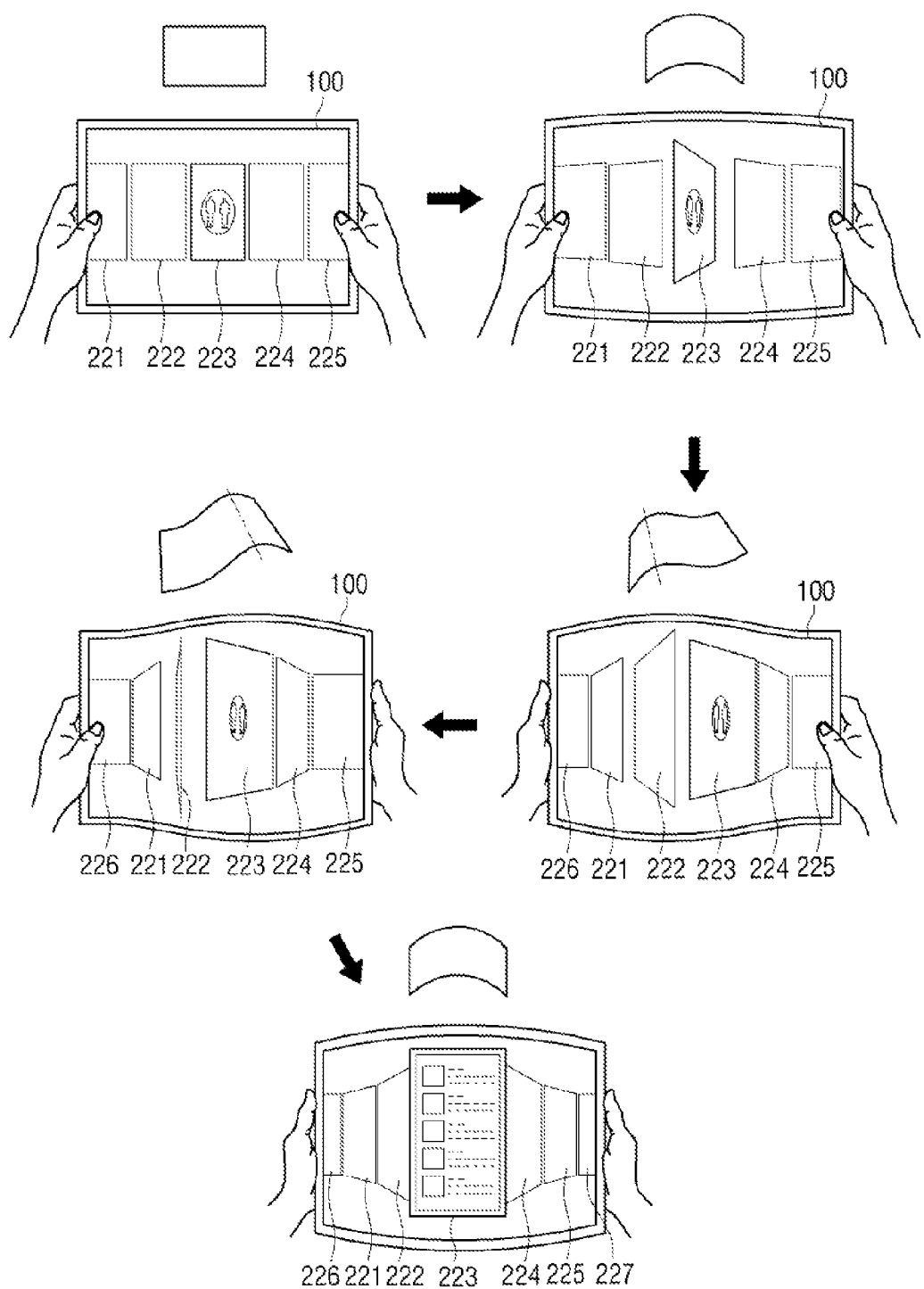
FIG. 22 is a view which illustrates a method for changing display states of screens, according to various exemplary embodiments.

FIG. 22 is a view which illustrates a method for changing a display state of a screen according to an exemplary embodiment.

As shown in FIG. 22, when the flexible display apparatus 100 is not bent, i.e., is in flat state, a plurality of contents 221, 222, 223, 224, and 225 are arranged sequentially in order to be displayed.

If a bending line is formed in a Z+ direction in a central part on the flexible display apparatus 100 based on a user control, shapes of contents displayed in the central area in which the bending line is formed are changed and displayed in accordance with the change. For example, the corresponding contents may be changed and displayed to have depths.

If the bending line formed in the central part on the flexible display apparatus 100 is moved into a left area, shapes of contents displayed in the left area may be changed and displayed accordingly. If the bending line moved into the left area is moved into a right area, shapes of contents displayed in the right area may be changed and displayed accordingly.

Displayed contents may also be moved into a move direction of the bending line based on the move of the bending line and displayed accordingly.

If the flexible display apparatus 100 is in a bending state which satisfies a preset condition, the flexible display apparatus 100 may perform a preset function or display new information.

For example, if a bending area having a bending state with preset radius R or more as shown in FIG. 22 is maintained for a preset time, the content 223 displayed in the corresponding bending area may be executed and/or otherwise accessed or implemented.

Figure 23:
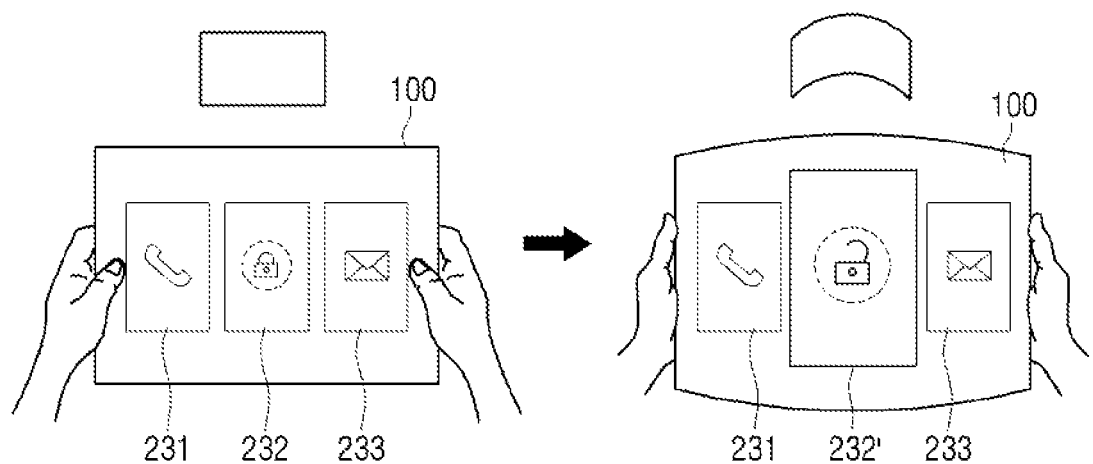
FIGS. 23 and 24 are views which illustrate a method for changing a display state of a screen, according to another exemplary embodiment.
Figure 24:
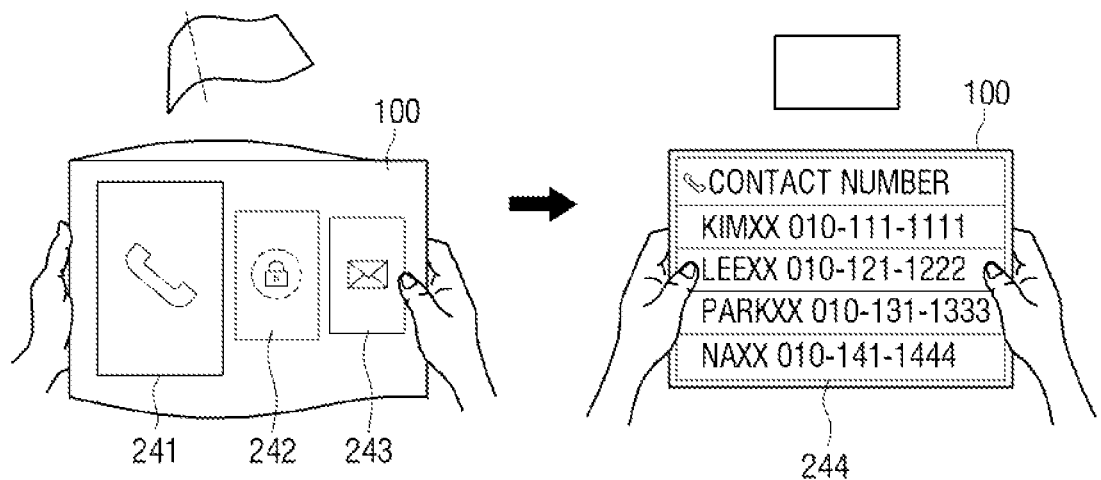

FIGS. 23 and 24 are views which illustrate a method for changing a display state of a screen according to another exemplary embodiment.

As shown in FIGS. 23 and 24, a shape of a content displayed in an area in which a bending line is formed based on a bending move control of a user may be changed and displayed accordingly in order to immediately execute the corresponding content.

For example, as shown in FIG. 23, a telephone function content 231, a lock/unlock function content 232, and a message function content 233 are provided on a screen of the flexible display apparatus 100.

If a bending line is formed in a central area based on a bending move control provided by a user, the lock/unlock function content 232 displayed in the central area is expanded and displayed. Further, the lock/unlock function content 232 is executed in accordance with a preset event in order to cancel a lock state of the flexible display apparatus 100. In particular, the preset event may include a preset time elapse or the like.

As shown in FIG. 24, if a bending line is moved into a left area based on a bending move control of a user, a telephone function content 241 displayed in the left area is expanded and displayed and then is executed based on a preset event in order to display stored contact information 244. In particular, the preset event may include an operation of making the flexible display apparatus 100 flat based on a user control.

In this case, if a bending move control occurs, i.e., a bending line is formed in a Z+ or Z− direction, a touch interaction is disabled. If the bending move control does not occur, i.e., the flexible display apparatus 100 is in a flat state, the touch interaction is enabled.

Figure 25:
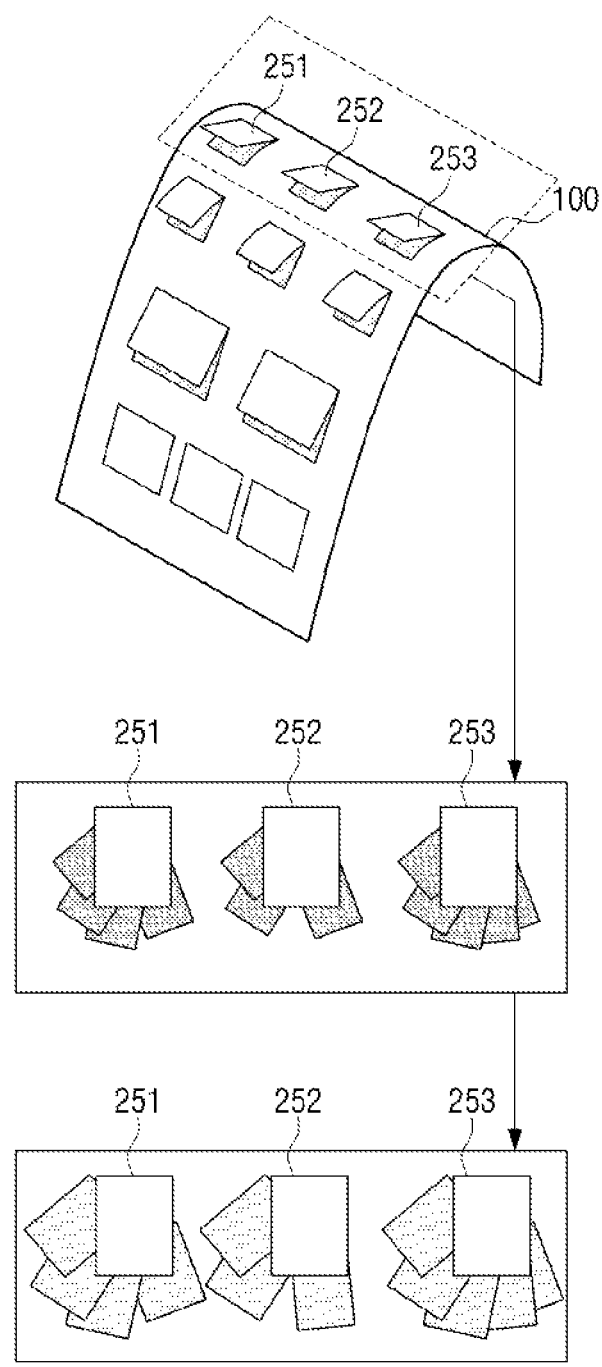
FIGS. 25 through 35 are views which illustrate a method for changing a display state of a screen, according to an exemplary embodiment.

FIG. 25 is a view which illustrates a method for changing a display state of a screen according to another exemplary embodiment.

As shown in FIG. 25, contents provided in a bending area which is formed based on a bending move control of a user are displayed to be lifted on space in accordance with a bending level of the bending area, e.g., a value of bending radius R.

In this case, as shown in FIG. 25, attributes of the corresponding contents 251, 252, 253 are displayed in shadow shapes. For example, lengths, colors, and/or any other relevant respective attributes of shadows may be variably displayed based on the number of sub-contents of the corresponding contents.

Further, spreading levels of the shadows increase with an increase in the bending radius R. If the bending radius R is increased to a preset value or more, detailed contents of the sub-contents are additionally displayed.

In this case, the user may immediately select a particular sub-content via a selection control performed with respect to the displayed sub-contents.

Figure 26:
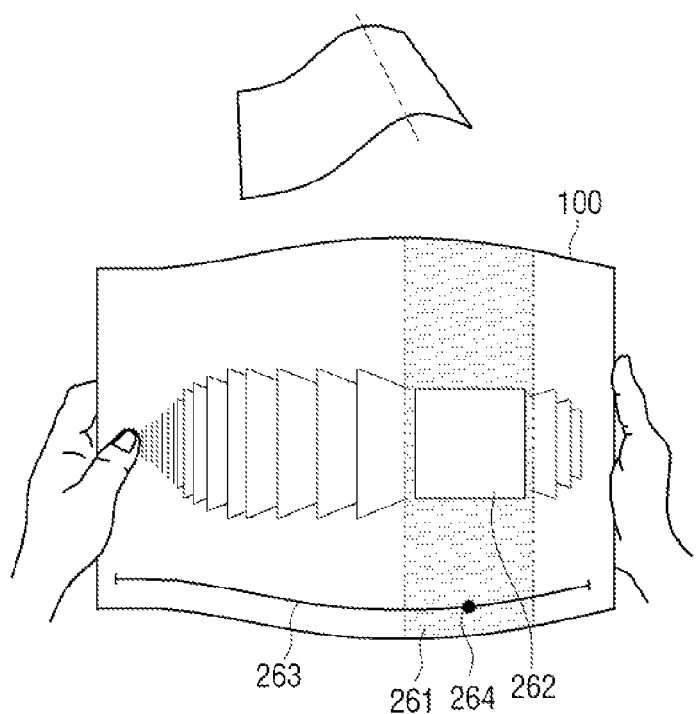
Figure 26:
Figure 26:
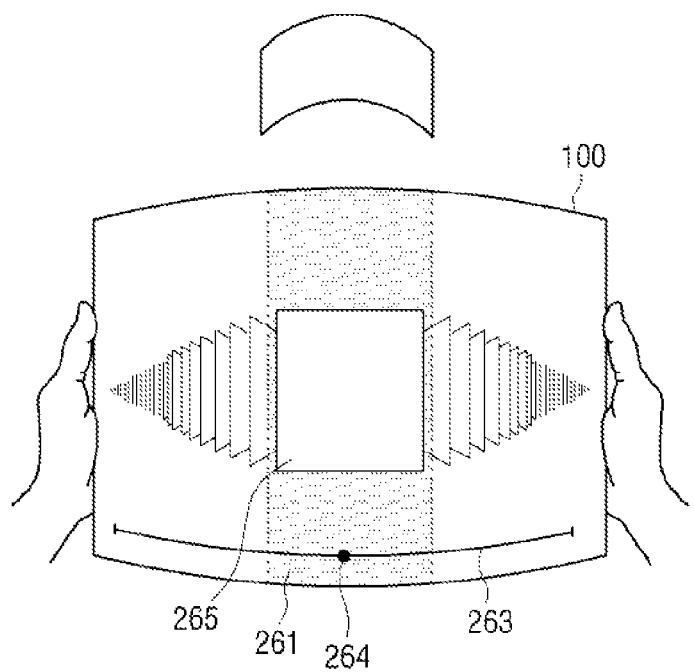

FIG. 26 is a view which illustrates a method for changing a display state of a screen according to another exemplary embodiment.

As shown in FIG. 26, a content scroll function is executed via implementation of a bending move control on the flexible display apparatus 100.

As shown in FIG. 26, a content 262 which is displayed in an area in which a bending line 261 is formed is displayed and highlighted in the greatest flat shape, and other contents are displayed in stacked shapes. Further, as a respective distance of each of the other contents from the area in which the bending line 261 is formed increases, a corresponding size of each of the other contents is reduced.

A scroll bar 263 and a scroll bar point 264 corresponding to the displayed contents are displayed to display the contents with respect to a location of the scroll bar point 264 based on a move of the bending line caused by the bending move control.

As shown in FIG. 26, if the bending line 261 is moved into a central area based on the bending move control, a content 265 which is displayed in the central area is displayed and highlighted in the greatest flat shape, and other contents are displayed in stacked shapes.

The scroll bar point 264 is moved into the area into which the bending line 261 is moved and displayed accordingly, based on the bending move control, such that a user intuitively recognizes an amount of scrolling.

Figure 27:
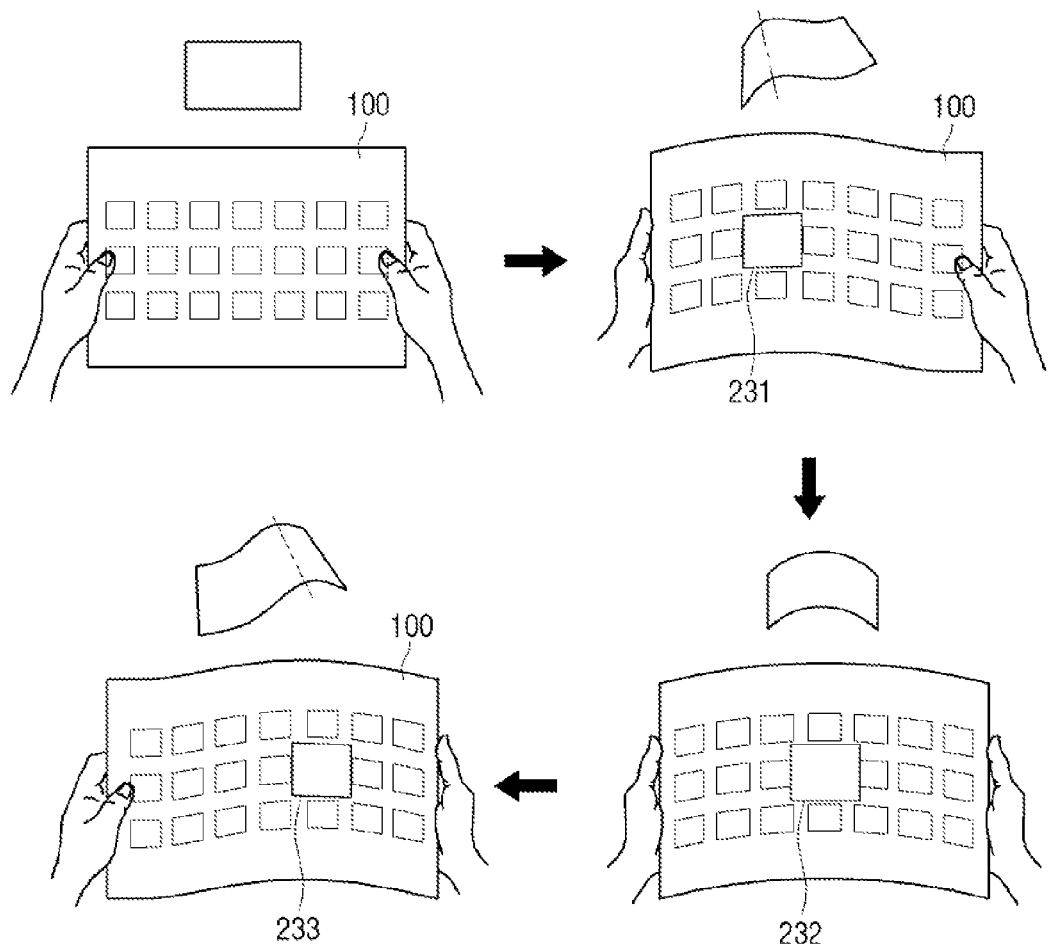

FIG. 27 is a view which illustrates a method for changing a display state of a screen according to another exemplary embodiment.

As shown in FIG. 27, if a bending line is formed in a left area based on a bending move control of a user when the flexible display apparatus 100 is in a flat state, a content 231 which is displayed in the corresponding area is displayed in a popup form. The content 231 which is located in a central area is displayed in the popup among contents displayed in the corresponding area, but this is only exemplary. For example, a plurality of contents displayed in the corresponding area may all be displayed in popup forms or may be displayed sequentially in respective popup forms.

If the bending line is moved into the central area based on the bending move control, the content 231 which is displayed in the popup form returns to its original state, and a content 232 which is displayed in the central area is displayed in a popup form.

If the bending line is moved into a right area based on the bending move control, the content 232 which is displayed in the popup form returns to its original state, and a content 233 which is displayed in the right area is displayed in a popup form.

The number of contents which are displayed in respective popup forms may increase or decrease based on one or more of a bending angle, a bending maintaining time, and/or any other relevant parameter relating to the bending line, and popup forms and sizes may be changed.

Figure 28:
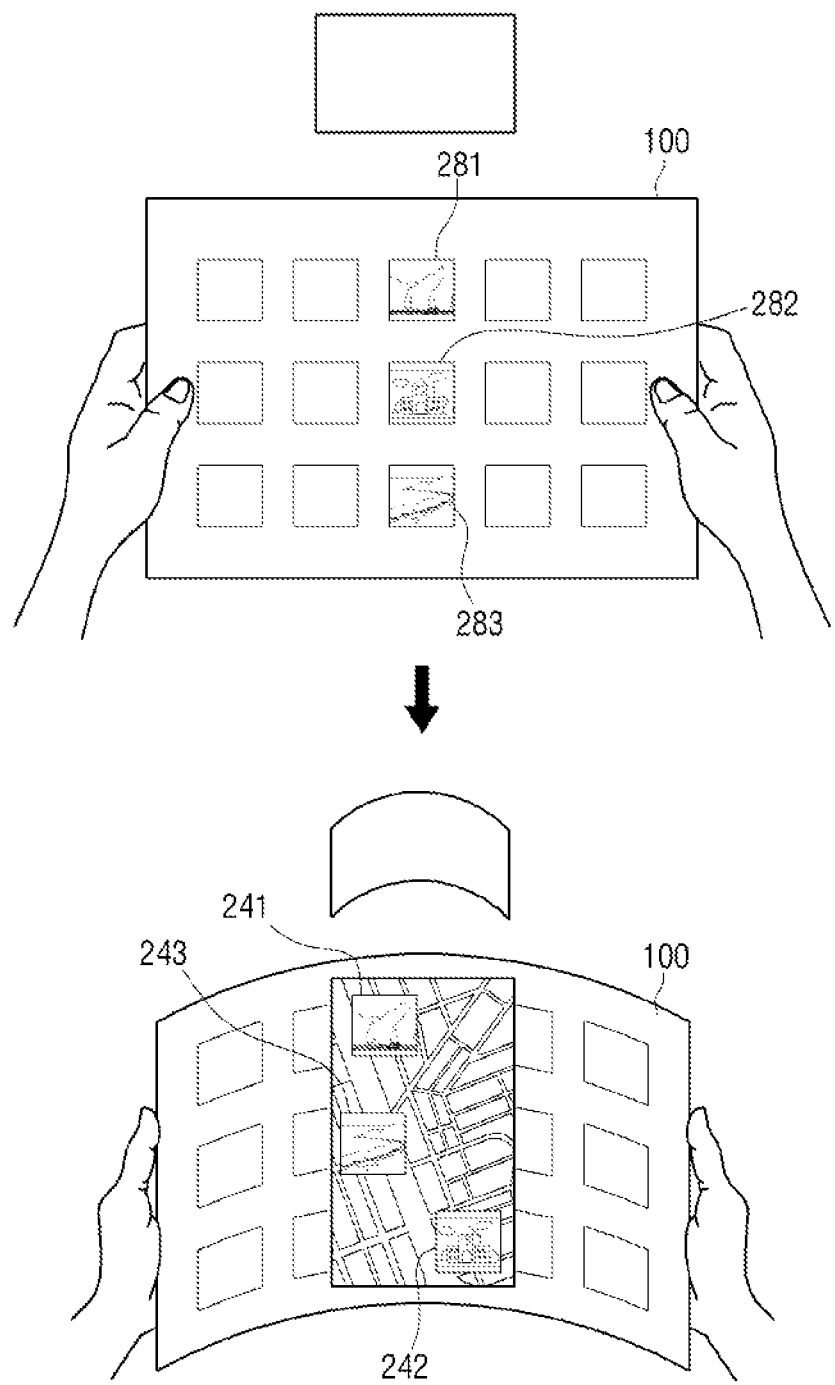

FIG. 28 is a view which illustrates a method for changing a display state of a screen according to another exemplary embodiment.

As shown in FIG. 28, if a bending line is formed in a central area based on a bending move control in a flat state in which picture contents are displayed, picture contents 281, 282, and 283 which are displayed in the central area are displayed on a map differently from the other contents. In particular, the picture contents 281, 282, and 283 are displayed such that locations of pictures captured on the map are distinguishable.

If the bending line is moved based on the bending move control, the picture contents 241, 242, and 243 which are displayed in the area into which the bending line is moved are displayed to distinguish the locations of the pictures captured on the map.

The number of contents displayed on the map may increase or decrease based on the bending angle, the bending maintaining time, and/or any other relevant parameter relating to the bending line, and a ratio and a size of the map and sizes of pictures displayed on the map may vary accordingly.

Figure 29:
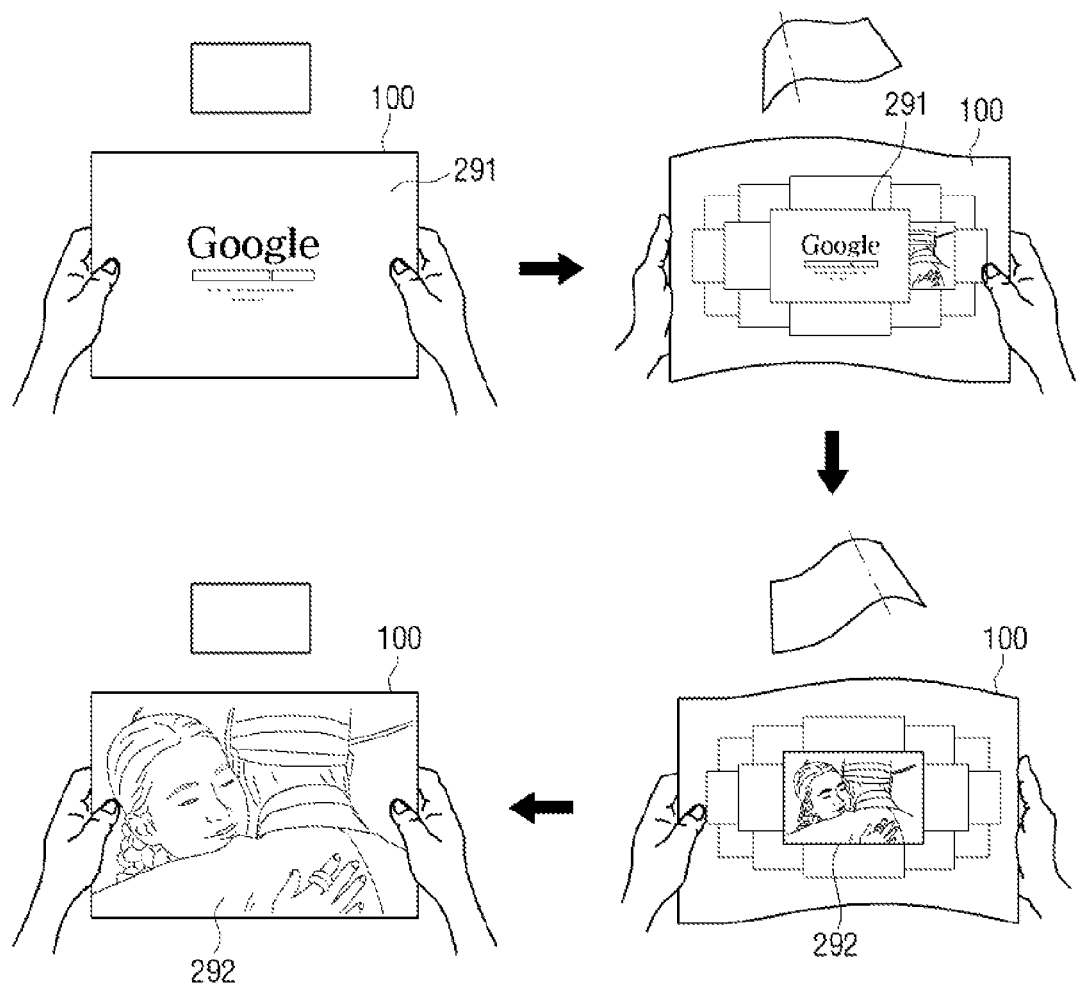

FIG. 29 is a view which illustrates a method for changing a display state of a screen according to another exemplary embodiment.

As shown in FIG. 29, a web browser screen 291 is displayed in a state in which the flexible display apparatus 100 is flat.

If a bending line is formed based on a bending move control of a user, all of application thumbnails which are being executed via multitasking are displayed in an peripheral area with respect to the web browser screen 291. For example, thumbnails of applications may be arranged and displayed on a 3D space.

In this case, the web browser screen 291 is highlighted and displayed in a central area.

If the bending line is moved based on the bending move control, the web browser screen 291 which is highlighted and displayed in the central area is changed into a thumbnail screen 292 to be displayed. For example, the bending line and a bending angle may be changed in order to move and display the web browser screen 291 into the central area in which application thumbnails adjacent thereto in the up, down, left, right, and diagonal directions are highlighted.

The application 292 which is highlighted in the central area may be executed via an exercise of the user control of making the flexible display apparatus 100 flat.

Figure 30:
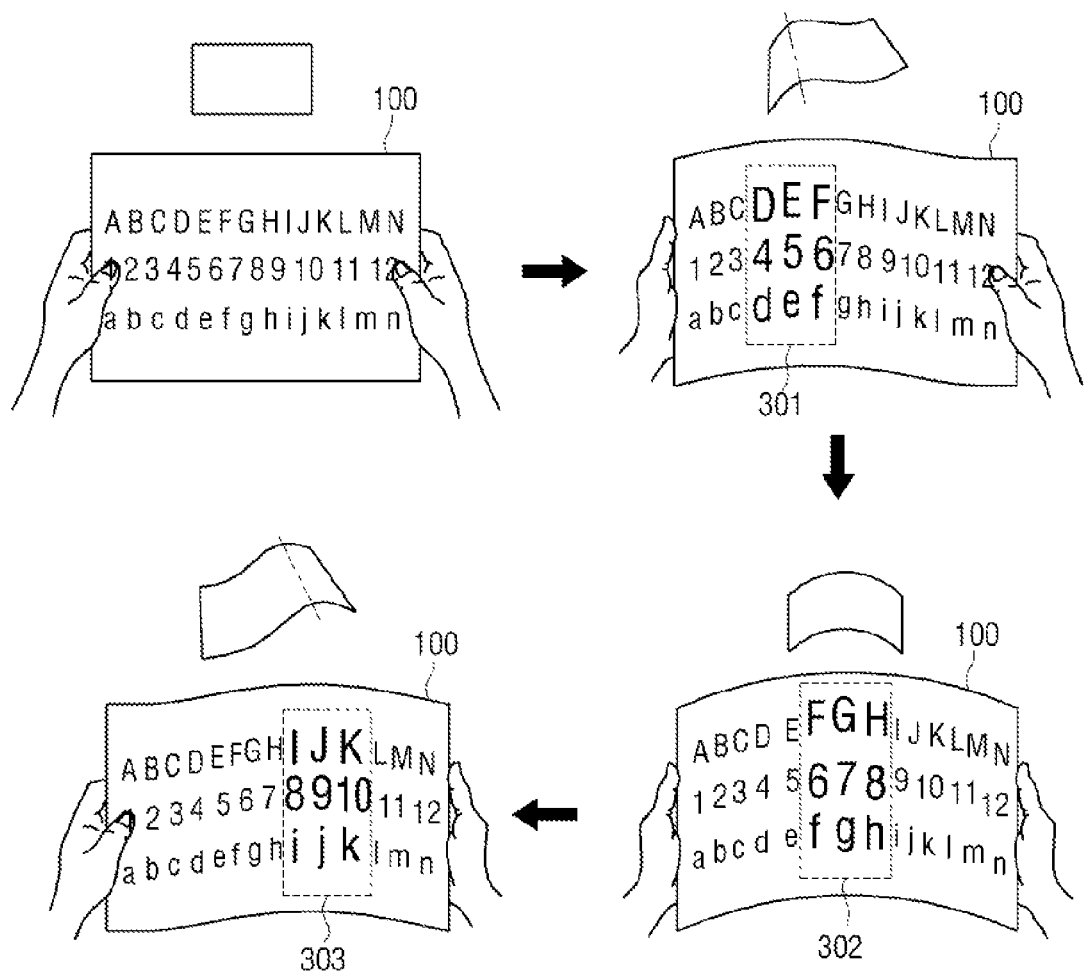

FIG. 30 is a view which illustrates a method for changing a display state of a screen according to another exemplary embodiment.

As shown in FIG. 30, a plurality of texts are displayed in lines on the flexible display apparatus 100. For example, e-book contents may be executed.

If a bending line is formed in a left area based on a bending move control of a user as shown in FIG. 30, texts 301 displayed in the left area are expanded and displayed.

If the bending line formed in the left area is moved into a central area based on the bending move control, the texts 301 displayed in the left area return to their original states, and texts 302 displayed in the central area are expanded and displayed.

If the bending line formed in the central area is moved into a right area based on the bending move control, the texts 302 displayed in the central area return to their original states, and texts 303 displayed in the right area are expanded and displayed.

Figure 31:
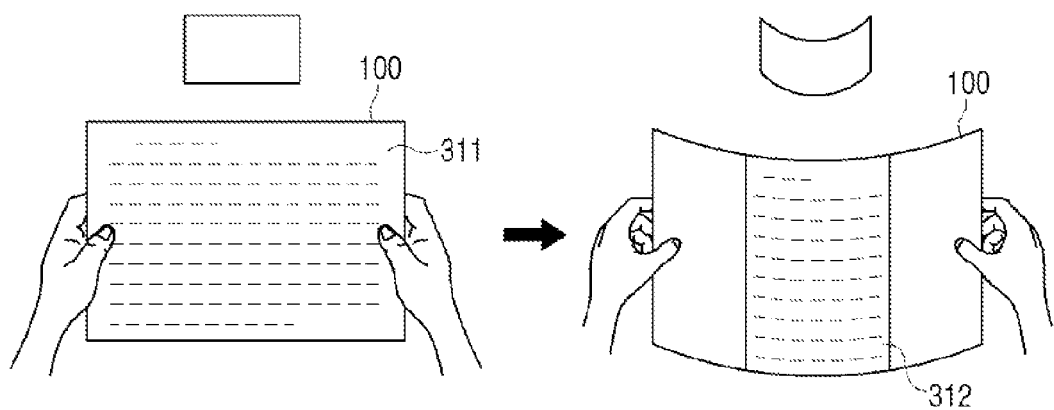

FIG. 31 is a view which illustrates a method for changing a display state of a screen according to another exemplary embodiment.

As shown in FIG. 31, a memo, a content, an e-book content, or the like is displayed on the screen of the flexible display apparatus 100.

If a user wants to see a corresponding content alone, i.e., without additional contents which may otherwise cause a distraction to the user, the user bends the flexible display apparatus 100 in a cradle shape and displays the content in a part in which a bending line is formed, in order to see the desired content in a solo view mode. In this case, a display shape of a particular content may be changed to reduce a size of the content displayed on a full screen in a flat state of the flexible display apparatus 100 or to display a part of the content so that the content corresponds to a bending area.

If the flexible display apparatus 100 is changed to a cradle shape after the bending move control occurs, a next page is displayed in the part in which the bending line is formed. This is only exemplary, and thus the next page may be displayed via exercise of a touch control.

Figure 32:
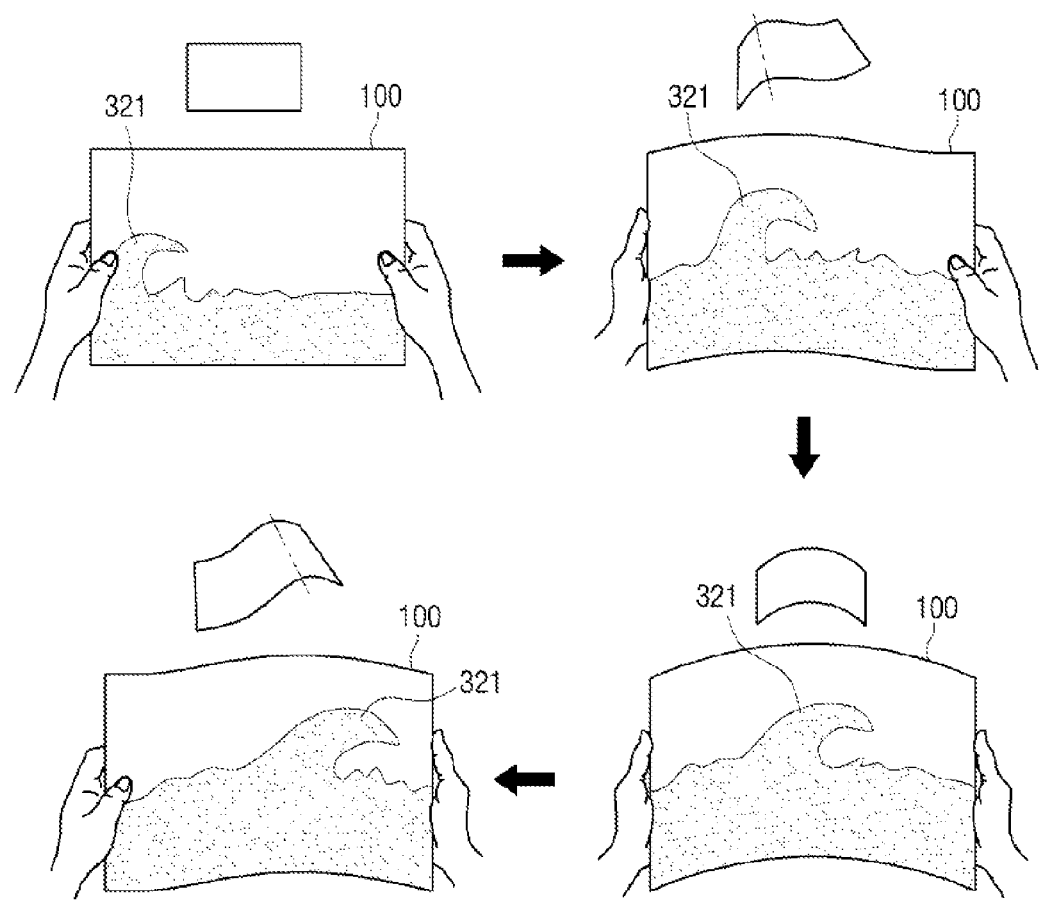
Figure 33:
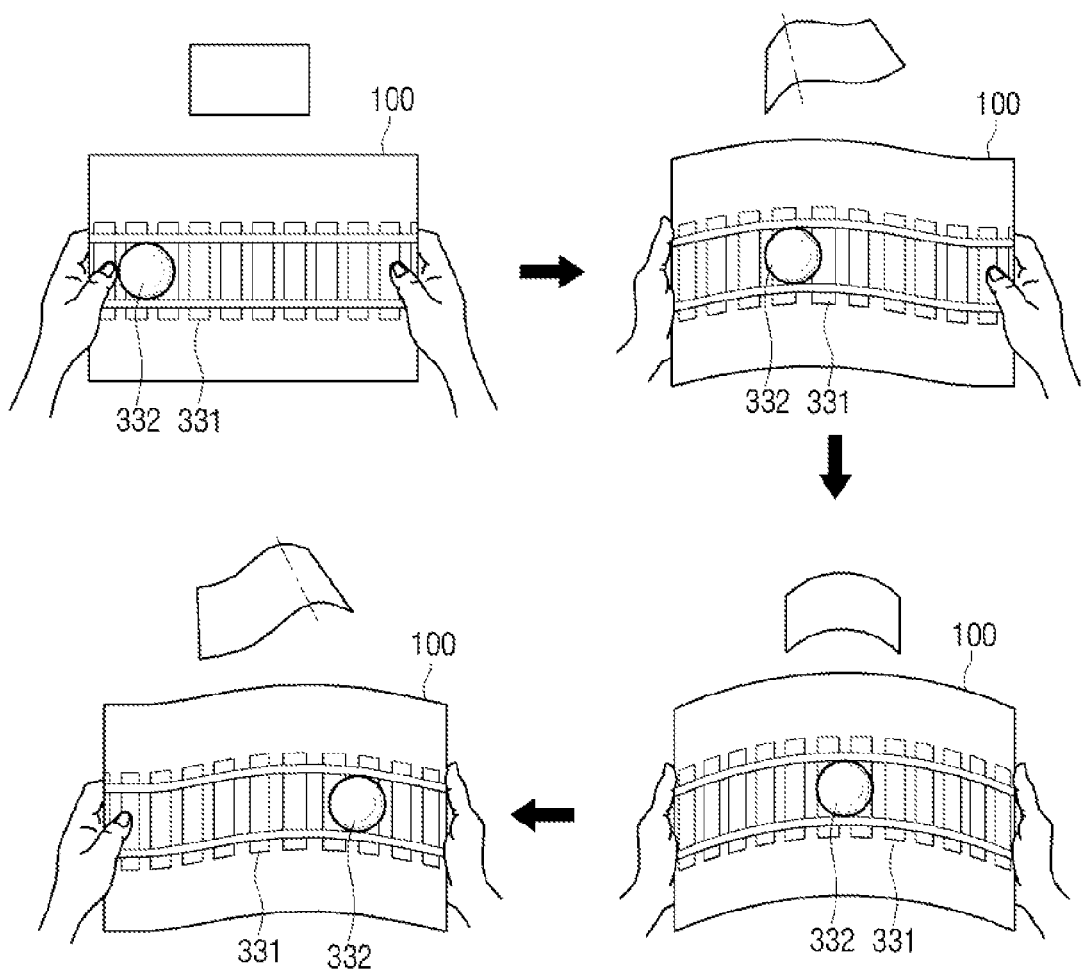

FIGS. 32 and 33 are views which illustrate methods for changing a display state of a screen according to other exemplary embodiments.

As shown in FIG. 32, a wave shape is displayed on the screen of the flexible display apparatus 100.

As shown in FIG. 32, the wave shape is moved in the same direction as a move direction of a bending line based on a bending move control of a user. This may be applied to a graphic effect and an operation of performing a preset function if a wave part 321 reaches a preset area.

As shown in FIG. 33, an object 332 on a railroad track 331 is displayed on the screen of the flexible display apparatus 100.

As shown in FIG. 33, the object 332 on the railroad 331 is moved in the same direction as a move direction of a bending area based on a bending move control of a user and displayed accordingly. This may be applied to a graphic effect and an operation of performing a preset function if the object 332 reaches a preset area.

Figure 34:
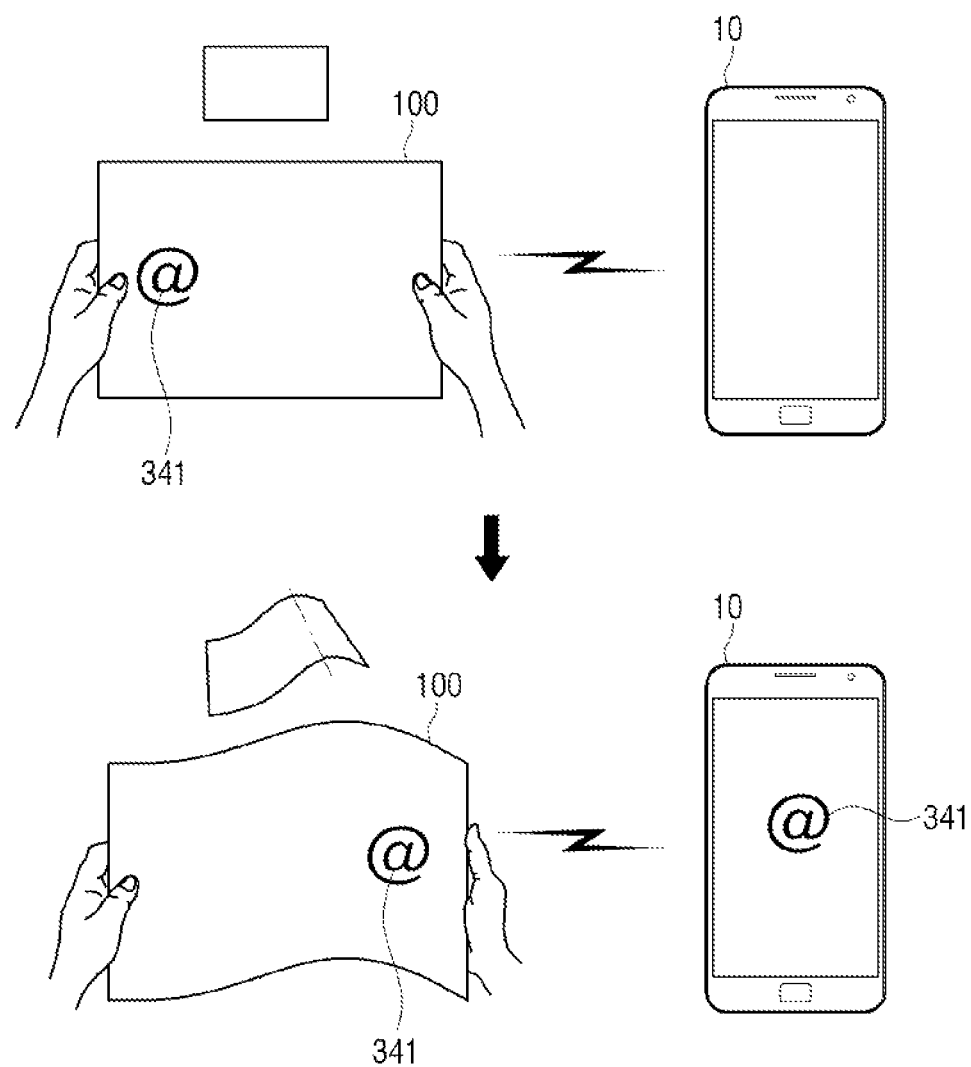

FIG. 34 is a view which illustrates a method for changing a display state of a screen according to another exemplary embodiment.

As shown in FIG. 34, if the flexible display apparatus 100 communicates with an external device 10, the flexible display apparatus 100 transmits a content to the external device 10 via execution of a bending move control.

If a bending move control is performed when content @ 341 is displayed on the screen of the flexible display apparatus 100, the content @ 341 which is displayed in an area into which a bending line is moved is also moved in accordance with the move of the bending line. In this case, the moved content @ 341 is transmitted to the external device 10 which communicates with the flexible display apparatus 100. In particular, the content @ 341 is transmitted to the external device automatically based on the area into which the bending line is moved.

If a plurality of external devices communicate with the flexible display apparatus 100, a corresponding content may be transmitted to the external device 10 which is located in a direction in which a bending area is moved.

Figure 35:
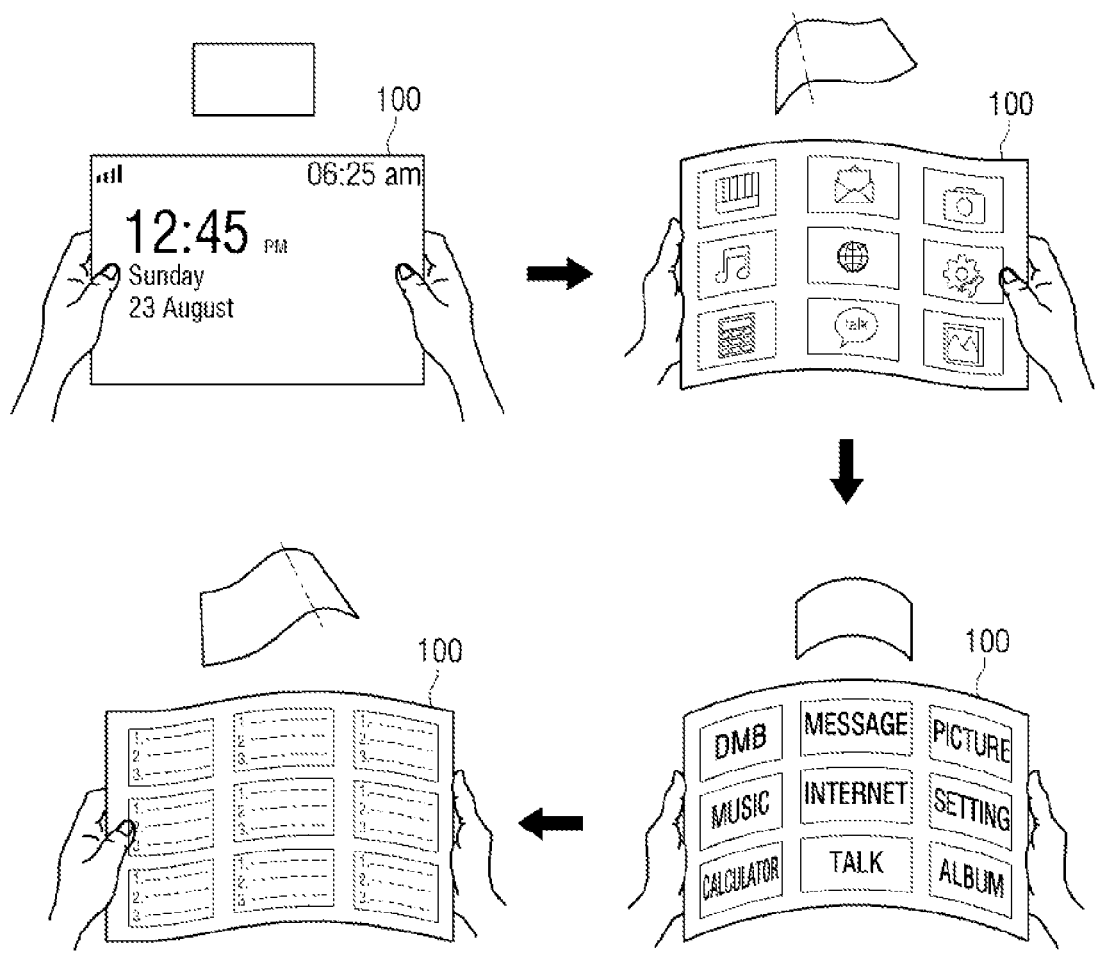

FIG. 35 is a view which illustrates a method for changing a display state of a screen according to another exemplary embodiment.

As shown in FIG. 35, the screen of the flexible display apparatus 100 is divided into a plurality of areas, and screen modes are respectively preset in the areas. In the present exemplary embodiment, a thumbnail view mode is set in a left area of the screen, a title view mode is set in a central area of the screen, and a list view mode is set in a right area of the screen.

If a bending line is formed in the left area based on a bending move control of a user when the flexible display apparatus 100 displays a default screen, a screen corresponding to the thumbnail view mode is displayed.

If the bending line formed in the left area is moved into the central area based on the bending move control, a screen corresponding to the title view mode is displayed.

If the bending line formed in the central area is moved into the right area based on the bending move control, a screen corresponding to the list view mode is displayed.

Figure 36:
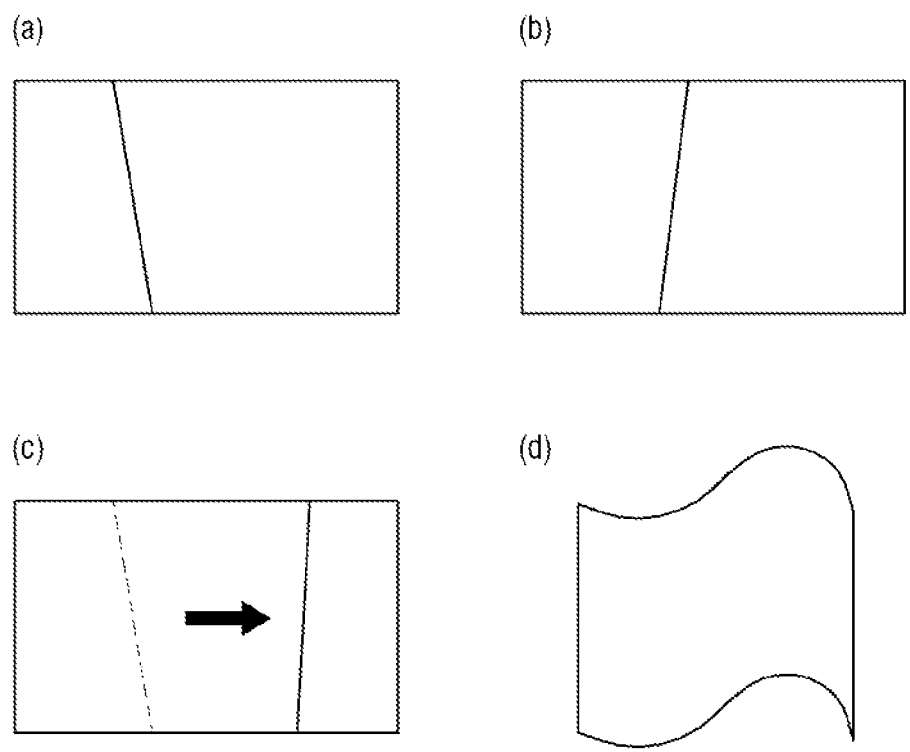
FIG. 36 includes a plurality of views which illustrate a method for operating a flexible display apparatus, according to an exemplary embodiment.

FIG. 36 includes a plurality of views which illustrate a method for operating a flexible display apparatus according to another exemplary embodiment.

The flexible display apparatus 100 according to an exemplary embodiment uses a tutorial function, i.e., a user guide program function, in order to prevent a malfunction.

For example, a bending angle may be changed by a user in a bending move. A setting value of each user with respect to a bending element may be customized by using the tutorial function. In particular, a setting object of each user may include one or more of a location in which a bending line is formed on an xy plane, a gradient of the bending line, a move direction of the bending line, a strength of the bending line, an angle of the bending line, a Z axis direction of the bending line, or the like. In this case, the bending line may include a surface or a dot in accordance with bending recognizing technologies.

As shown in view (a) and view (b) of FIG. 36, the location and the gradient of the bending line may be independently set based on user selection. As shown in view (c) of FIG. 36, a location into which the bending line is moved based on the bending move control may be independently set based on user selection.

As shown in view (d) of FIG. 36, the strength and the angle of the bending line may be independently set based on user selection.

Figure 37:
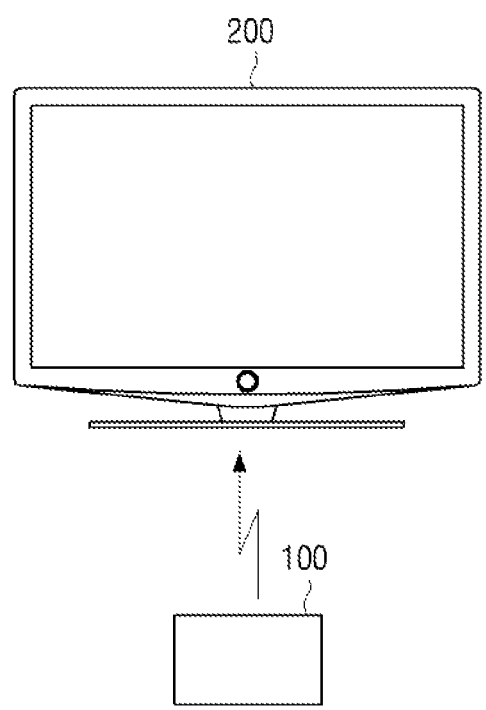
FIG. 37 includes a plurality of views which illustrate a structure of a flexible display apparatus which operates in conjunction with an external display apparatus, according to another exemplary embodiment.
Figure 37:
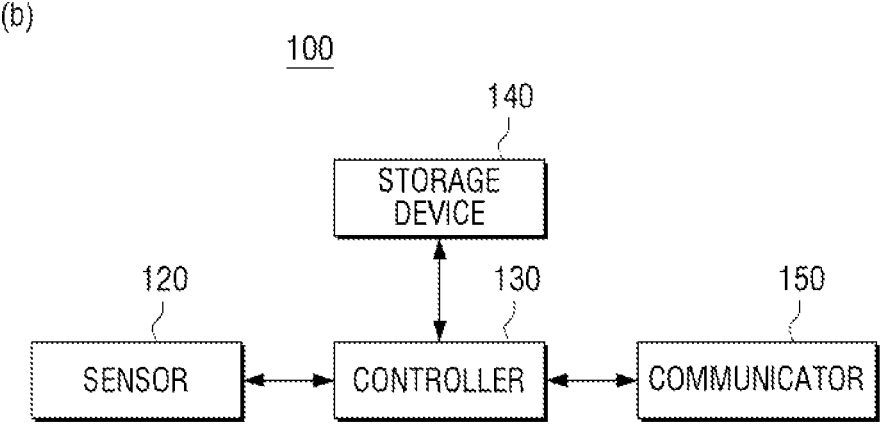

FIG. 37 includes a plurality of views which illustrate a structure of a flexible apparatus which operates in conjunction with an external display apparatus, according to another exemplary embodiment.

Referring to view (a) of FIG. 37, a flexible apparatus 100 is connected to a display apparatus 200 by one of a wired connection and a wireless connection. The flexible apparatus 100 may be formed by using a flexible material in order to be arbitrarily bent by a user as described above. The display apparatus 200 may be realized as a general display apparatus which is inflexible. In particular, the display apparatus 200 may be realized as various types of display apparatuses such as a TV, an e-frame, a monitor, a billboard, and/or any other type of display apparatus.

For example, the flexible apparatus 100 may be operated via exercise of a remote control apparatus which uses the display apparatus 200 as an apparatus to be controlled. The flexible apparatus 100 receives a user command in order to control the display apparatus 200 and transmits a control signal which corresponds to the received user command to the display apparatus 200.

In particular, the flexible apparatus 100 senses a bending move control and transmits a signal which corresponds to the sensed bending move control to the display apparatus 200. In this case, the flexible apparatus 100 may transmit the signal (hereafter referred to as a control signal) which corresponds to the sensed bending move control. However, the flexible display apparatus 100 may transmit a signal (hereinafter referred to as control information), into which the signal corresponding to the sensed bending move control has been converted into a control command in order to control the display apparatus 200. This may depend on whether an operation for calculating the control information from the sensed signal is performed in the display apparatus 200.

The flexible apparatus 100 and the display apparatus 200 communicate with each other in accordance with any of various communication methods, such as, for example, BlueTooth (BT), IR Interface, WiFi, PAN, LAN, WAN, Wired I/O, USB, and/or any other relevant communication method. For example, if the flexible apparatus 100 and the display apparatus 200 communicate with each other by using BT, the flexible apparatus 100 and the display apparatus 200 may operate together via a BT paring. A detailed technique related to the BT paring is obvious to those skilled in the art, and thus a detailed description thereof will be omitted.

If a control signal which corresponds to a bending is received from a bendable and flexible apparatus, the display apparatus 200 performs a control operation based on the control signal. The control signal may be realized as an IR signal or a communication signal which is transmitted via any of various types of interfaces, such as, for example, BT, NFC, WiFi, Zigbee, a serial interface, and/or any other relevant type of interface. In this case, the flexible apparatus 100 includes a sensor 120, a controller 130, and a storage device 140, but not a display device 110, as shown in view (b) of FIG. 37. The flexible apparatus 100 may further include a communicator 150 which communicates with the display apparatus 200.

The storage device 140 stores various types of commands which correspond to the bending. If the sensor 120 senses a bending, the controller 130 detects a command which corresponds to the sensed bending from the storage device 140, generates a control signal which corresponds to the detected command, and transmits the generated control signal to the display apparatus 200 via the communicator 150. The commands stored in the storage device 140 are respectively allocated to bending types supported by the display apparatus 200 to be pre-stored. In particular, the storage device 140 may store a command which corresponds to a bending move control.

Therefore, if the sensor 120 senses a bending, the controller 130 transmits a control signal, which is used to instruct a control operation which corresponds to the sensed bending, to the display apparatus 200. As a result, the user bends the flexible apparatus 100 in order to control an operation of the display apparatus 200.

For example, if a bending line which is formed based on a bending is continuously moved in a first direction and thus reaches a location corresponding to a display location of at least one object in the display apparatus 200, the controller 130 transmits a control signal, which is used to provide a visual feedback with respect to the at least one object, to the display apparatus 200.

If a bending line which is formed in a first location based on a bending is continuously moved in the first direction and thus reaches a second location, the controller 130 transmits a control signal, which is used to move at least one object displayed in a location corresponding to the first location into a display location corresponding to the second location in order to display the at least one object in the second location, to the display apparatus 200. In this case, the controller 130 may transmit a control signal, which is used to transmit at least one object moved and displayed into the display location corresponding to the second location in the display apparatus 200 to an external device corresponding to the display location, to the display apparatus 200. Further, if the at least one object is transmitted to the external device, the controller 130 may transmit a control signal, which is used to cause the at least one object to disappear from the display location, to the display apparatus 200.

However, as described above, the flexible apparatus 100 may transmit only a sensing signal to the display apparatus 200 and generate a control signal which corresponds to the sensing signal received by the display apparatus 200.

Sensitivity of the flexible apparatus 100 may match with reactivity of the display apparatus 200 for operation of the flexible apparatus 100 and the display apparatus 200. For example, an object displayed on the display apparatus 200 may be moved based on a bending move control for the flexible apparatus 100. If the displayed object is a light ping-pong ball, the light ping-pong ball may be rapidly moved based on the bending move control. However, if the displayed object is a heavy bowling ball, the heavy bowling ball may be slowly moved. In particular, the object displayed in the display apparatus 200 may be simply moved based on the bending move control, and a move state may be variously displayed such that the user recognizes a characteristic of the moved object. This function may be used in many different fields such as, for example, games or education.

Figure 38:
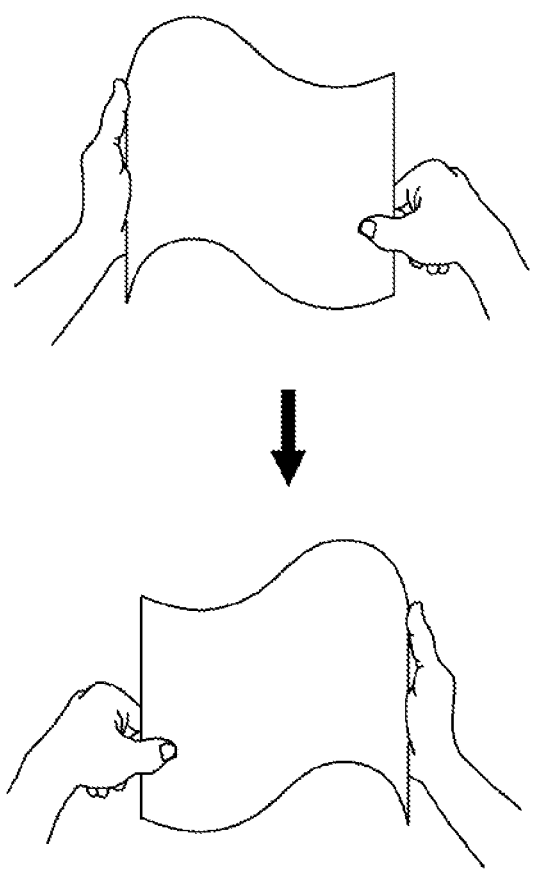
FIG. 38 is a view which illustrates a method for operating the flexible display apparatus of FIG. 37, according to another exemplary embodiment.

FIG. 38 is a view which illustrates a method for operating the flexible apparatus 100 of FIG. 37.

A one-time bending move control for the flexible apparatus 100 as shown in FIG. 38 may include a basic bending control for controlling the display apparatus 200.

If a bending move control is sensed one time in the flexible display apparatus 100, various functions of the display apparatus 200 may be controlled. For example, if the bending move control is sensed one time in the flexible apparatus 200, various functions, such as a channel change, a volume adjustment, a brightness adjustment, a display page change, a file transmission and reception, and/or any other relevant function, may be executed in the display apparatus 200. In this case, when the bending move control starts, a corresponding function may be performed based on a type of a content displayed on the display apparatus 200, and the function may be executed in the display apparatus 200. For example, if the bending move control is sensed in the flexible apparatus 100 when an Internet function is executed in the display apparatus 200 and thus a webpage is displayed, a page change function may be executed.

Further, if a bending shape is maintained for a preset time or more when the one-time bending move control is completed in the flexible apparatus 100, a mapped function may be repeatedly or rapidly performed. For example, a channel change, a volume adjustment, or a page change may be rapidly performed.

If a start shape of the bending move control, i.e., the bending shape, is maintained for the preset time or more as shown in a left part of the flexible apparatus as shown in FIG. 38, the corresponding control may be used as an "all" selection concept, such as, for example, a transmission of a larger number of files or a deletion of a larger number of files.

If the bending move control is sensed one time in the flexible apparatus 100, at least one of an audio feedback and a haptic feedback appropriate for an occurrence time, a move time, and an end time of a bending line may be provided. Therefore, the user may recognize whether the bending move control has been completed.

FIGS. 39, 40, 41, and 42 are views which illustrate respective methods for operating a flexible apparatus according to various exemplary embodiments.

Figure 39:
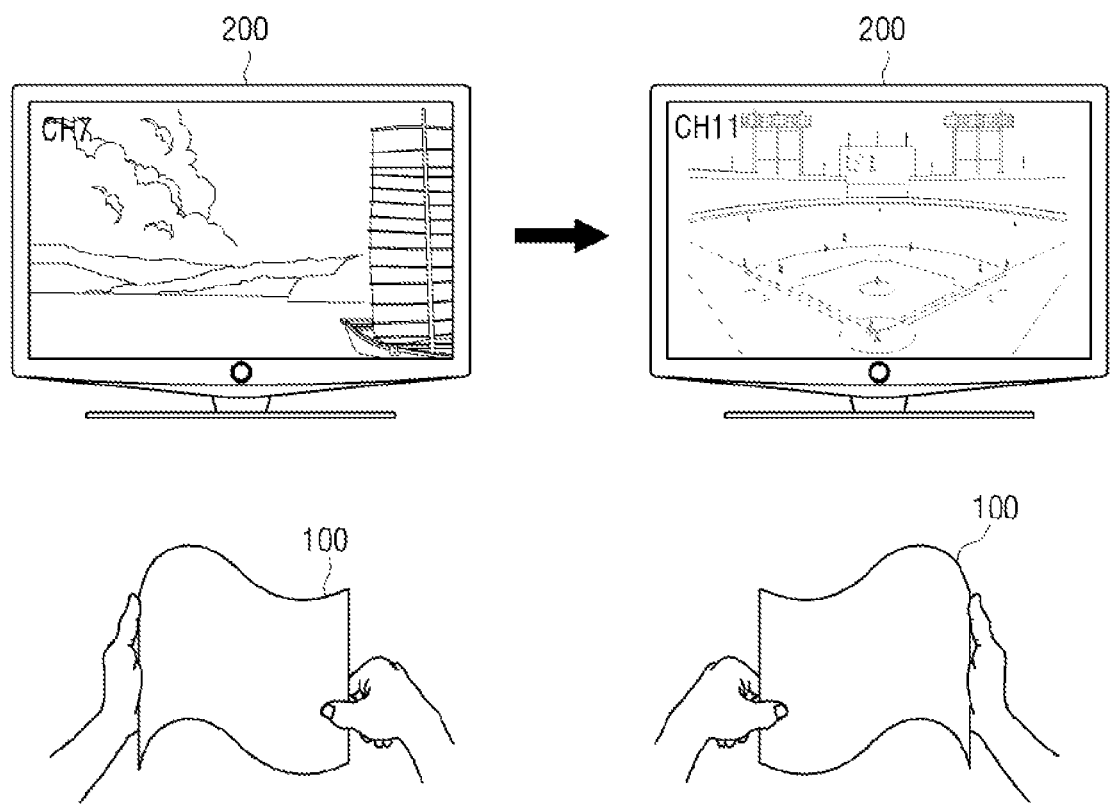
FIGS. 39, 40, 41, and 42 are views which illustrate respective methods for operating a flexible display apparatus, according to various exemplary embodiments.

As shown in FIG. 39, a channel change function is performed in the display apparatus 200 as a result of a bending move control which is provided with respect to the flexible apparatus 100.

If a bending move control is sensed in the flexible apparatus 100 when a particular channel is selected and broadcast in the display apparatus 200, a control signal corresponding to the flexible apparatus 100 is transmitted to the display apparatus 200. In this case, a channel change from a current channel to a next channel or a previous channel may be performed in the display apparatus 200 based on the received control signal. In particular, the channel change to the next channel or the previous channel may be performed based on a start location of bending, a Z direction of a bending line, and/or any other parameter relating to the bending line. If a bending state is maintained after a one-time control, the channel change may be consecutively performed.

Figure 40:
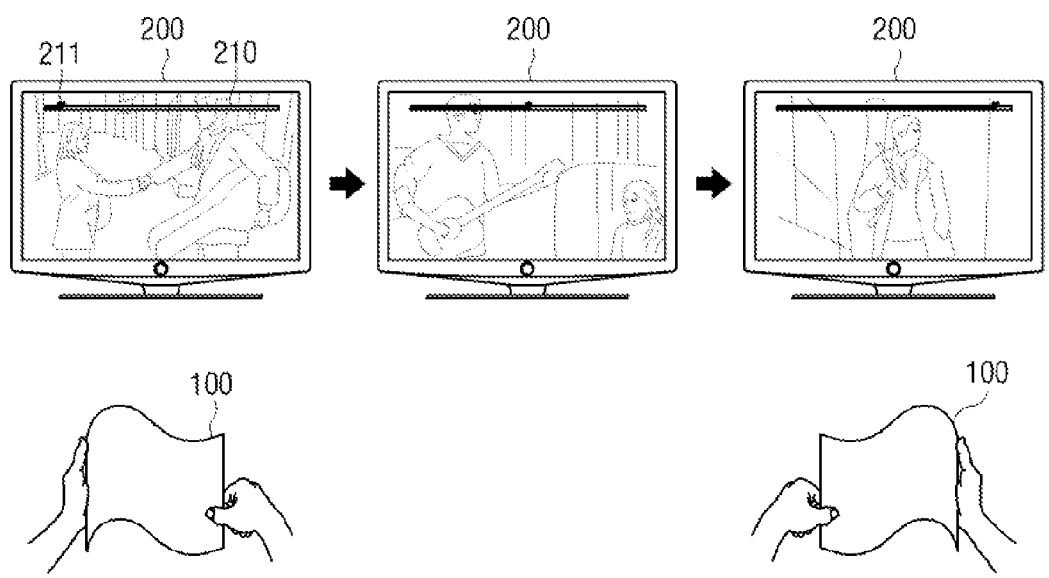

As shown in FIG. 40, if a bending move control is sensed in the flexible apparatus 100 when a moving picture is displayed or played in the display apparatus 200, the flexible apparatus 100 transmits a corresponding control signal to the display apparatus 200. In this case, a pointer location 211 of a moving picture play bar 210 may be controlled in the display apparatus 200 based on the received control signal. In particular, as shown in FIG. 40, a pointer 211 indicating a play location of the moving picture play bar 210 is moved based on a direction of the bending move control, and an image corresponding to a play time at which the moved pointer is located is displayed.

Figure 41:
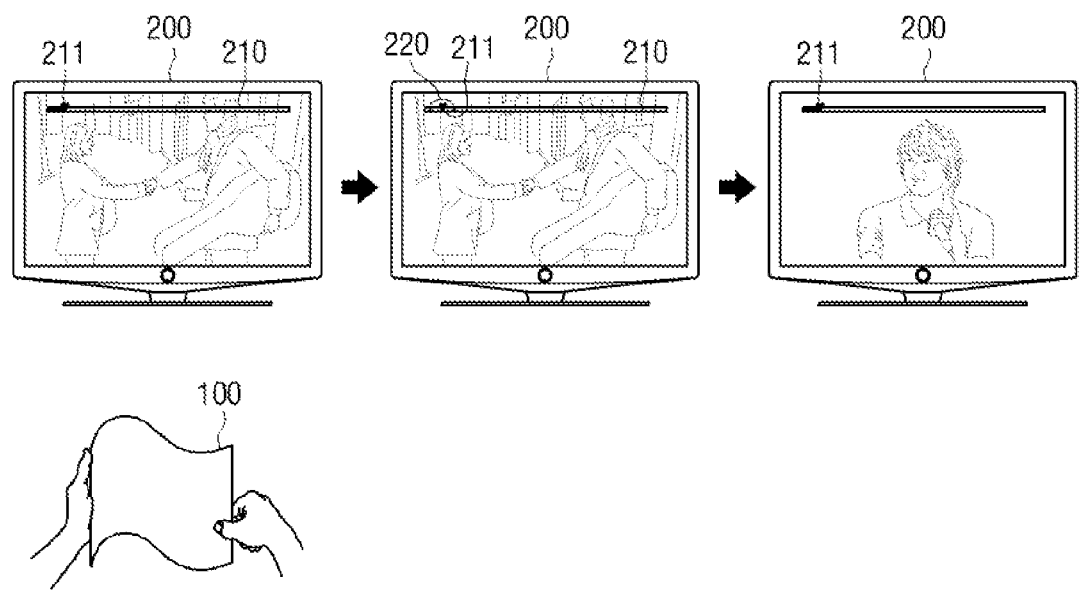

As shown in FIG. 41, if a control for maintaining a particular bending state for a preset time or more is sensed when a moving picture is displayed or played in the display apparatus 200, the flexible apparatus 100 transmits a corresponding control signal to the display apparatus 200. In this case, a corresponding section of a moving picture play bar may be expanded and displayed in the display apparatus 200 based on the received control signal. As shown in FIG. 41, if a particular section 220 of the moving picture play bar 210 is selected as a result of a particular bending move control, a play part corresponding to the particular section 220 is expanded to be displayed on a full screen. Therefore, a minute control operation may be performed with respect to the corresponding section. The expanded section may return to its original state by performing an additional bending or a bending move control of another area.

Figure 42:
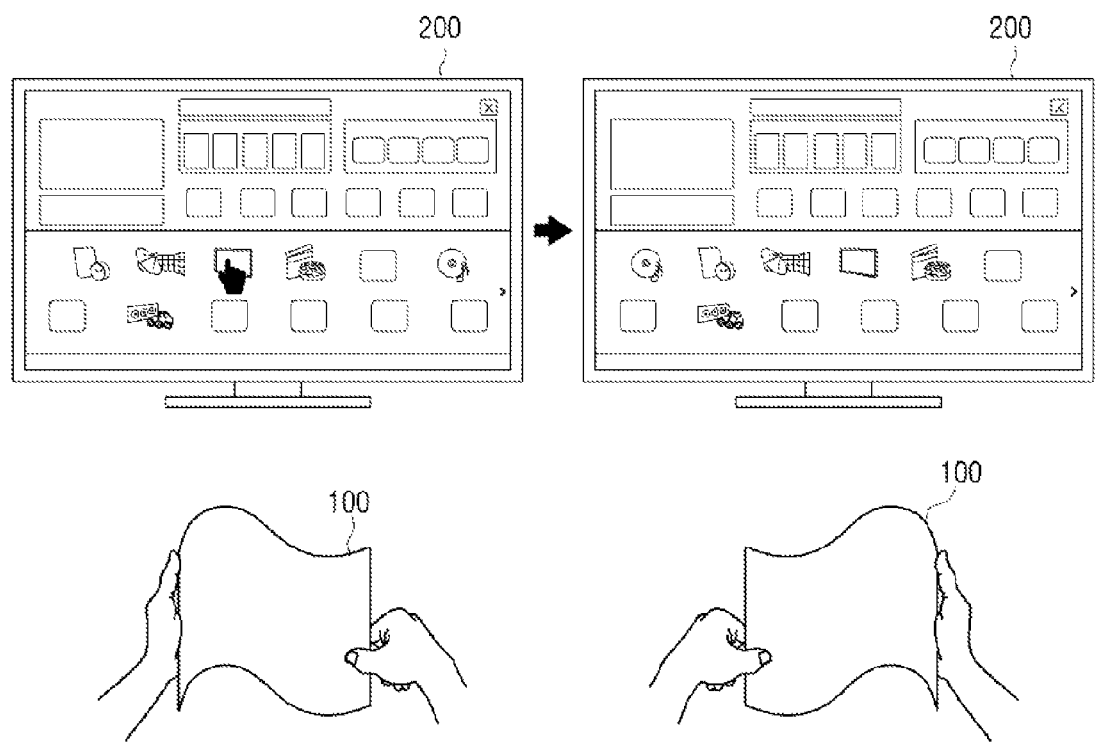

As shown in FIG. 42, if a bending move control is performed in the flexible apparatus 100 when a UI screen is displayed in the display apparatus 200, the UI screen may be changed to another UI screen in order to be displayed in the display apparatus 200. For example, as shown in FIG. 42, a currently displayed UI page may be changed to a next UI page to be displayed.

Figure 43:
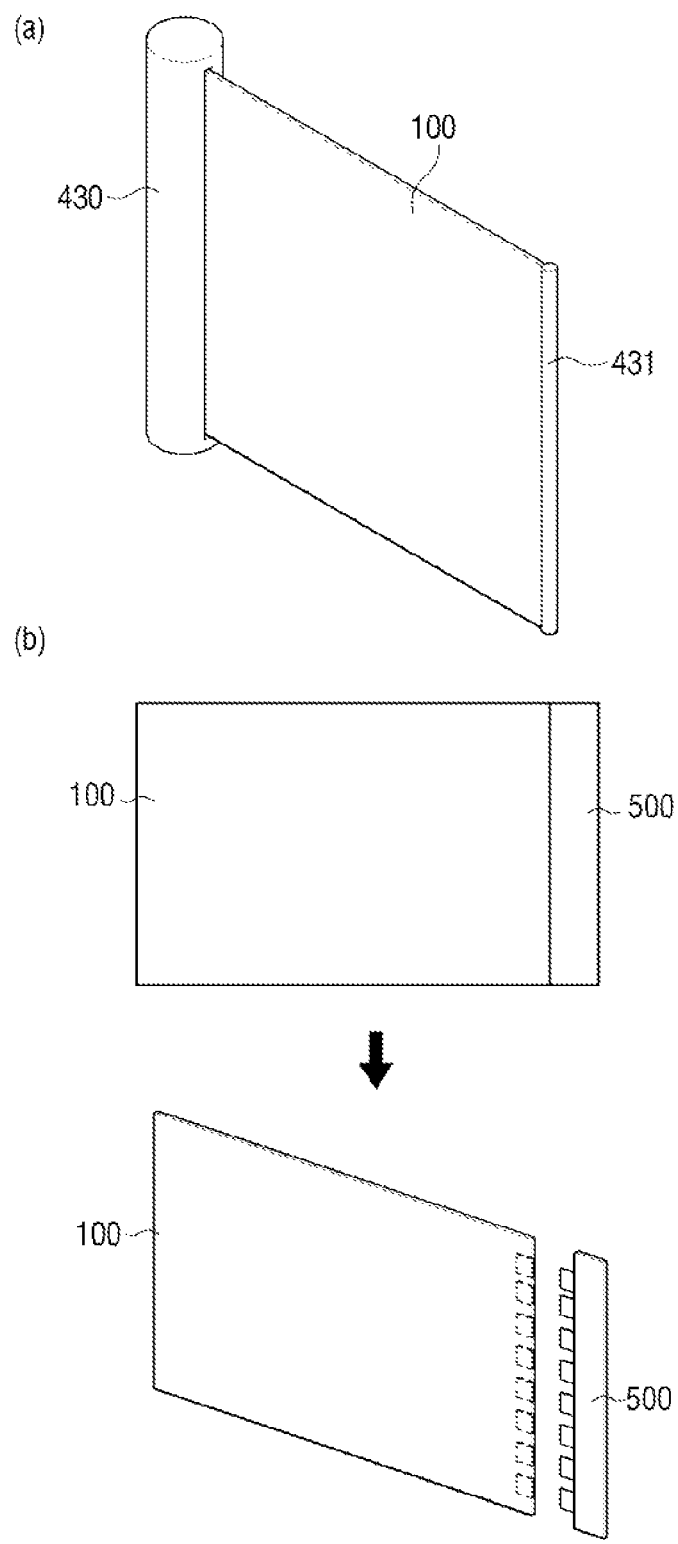
FIGS. 43 and 44 are views which illustrate shapes of flexible display apparatuses, according to various exemplary embodiments.

View (a) of FIG. 43 is a view which illustrates a shape of a flexible display apparatus installed at a main body according to an exemplary embodiment.

Referring to view (a) of FIG. 43, the flexible display apparatus 100 includes a main body 430, a display device 110, and a gripper 431.

The main body 430 operates as a kind of case which contains the display device 110. If the flexible display apparatus 100 includes various types of elements as shown in FIG. 17, the other elements except for the display device 110 and some sensors may be installed at the main body 430. The main body 430 includes a rotary roller which rolls the display device 110. Therefore, if the display device 110 is not used, the display device 110 is rolled based on the rotary roller which is installed in the main body 430.

If a user grips and pulls the gripper 431, the rotary roller rotates in a direction opposite to rolling in order to unroll, and the display device 110 comes out of the main body 430. The rotary roller may include a stopper. Therefore, if the user pulls the gripper 431 by a predetermined distance or more, the rotation of the rotary roller stops by action of the stopper, and the display device 110 is fixed. Therefore, the user execute various functions by using the display device 110 while exposed to the outside. If the user presses a button for stopping the stopper, the stopper stops, and thus the rotary roller rotates in a reverse direction. As a result, the display device 110 is re-rolled into the main body 430. The stopper may have a switch shape which stops an operation of a gear for rotating the rotary roller. A structure used in a general rolling structure may be used for the rotary roller and the stopper, and thus detailed illustration and description thereof will be omitted.

The main body 430 includes the power supply 500. The power supply 500 may be realized as various types, such as, for example, a battery connector in which a disposable battery is installed, a secondary battery which is recharged a plurality of number of times by a user, a solar battery performing generation by using solar heat, and/or any other suitable type of power supply device. If the power supply 500 is realized as the secondary batter, the user may connect the main body 430 to a external power source in order to charge the power supply 500.

The main body 430 has a cylindrical shape in view (a) of FIG. 43, but may have a square shape, a polygonal shape, or the like. Further, the display device 110 may be installed in the main body 430 so as not to be exposed to the outside through pulling, or may enclose an outer surface of the main body 430.

View (b) of FIG. 43 is a view which illustrates a flexible display apparatus from which the power supply 500 is removed. Referring to view (b) of FIG. 43, the power supply 500 is installed at an edge of a side of the flexible display apparatus 100 in order to be removable with respect to the flexible display apparatus 100.

The power supply 500 may be realized as a flexible material to be bent in conjunction with the display device 110. In particular, the power supply 500 may include a cathode current collector, a cathode, an electrolyte part, an anode, an anode current collector, and a coating part which coats any or all of the aforementioned parts.

For example, a current collector may be formed from a conductive material, such as a TiNi-based alloy, all-metal such as aluminum or the like, carbon-coated all-metal, carbon, a carbon fiber, or the like, or conductive polymer such as polypyrole.

The cathode current collector may be formed from a cathode material, such as a metal such as lithium, natrium, zinc, magnesium, a hydrogen storage alloy, lead, or the like, a non-metal such as carbon or the like, or a polymer electrode material such as organic sulfur.

The anode may be formed from an anode material such as sulfur, metal sulfide, a lithium transition metal oxide such as $LiCoO_2$, $SOCL_2$, $MnO_2$, $Ag_2O$, $Cl_2$, $NiCl_2$, $NiOOH$, a polymer electrode, or the like. The electrolyte part may be realized in a gel type which uses at least one of PEO, PVdF, PMMA, PVAC, or the like.

The coating part may be formed from a general polymer resin. For example, the coating part may be formed from at least one of PVC, HDPE, or an epoxy resin, or the like. The coating part may also be formed from a material which prevents a damage to a thread-shaped battery and is freely bendable.

Each of a cathode and an anode may respectively include one or more connectors which enable the cathode and/or the anode to be electrically connected to the outside.

Referring to view (b) of FIG. 43, the connectors protrude from the power supply 500, and grooves corresponding to locations, sizes, and shapes of the connectors are formed in the display device 110. Therefore, the connectors are combined with the grooves to combine the power supply 500 with the display device 110. The connectors of the power supply 500 are connected to power connection pads (not shown) of the flexible display apparatus 100 in order to supply power to the flexible display apparatus 100.

The power supply 500 is removable from the edge of the side of the flexible display apparatus 100 in view (b) of FIG. 43, but this is only exemplary. Therefore, a location and a shape of the power supply 500 may be varied based on a product characteristic. For example, if the flexible display apparatus 100 is a product which has a predetermined thickness, the power supply 500 may be installed on a back surface of the flexible display apparatus 100.

Figure 44:
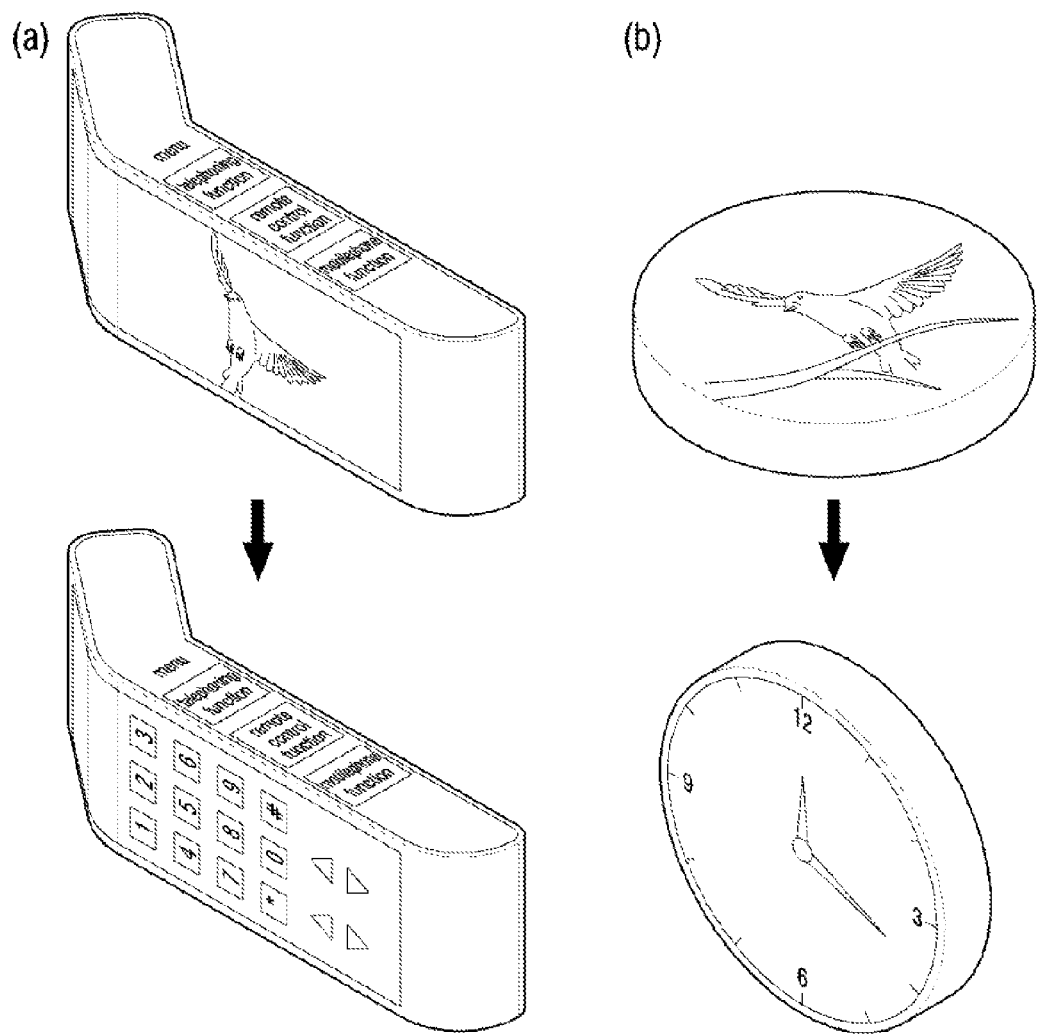

Views (a) and (b) of FIG. 44 are views which illustrate various shapes of a flexible display apparatus according to various exemplary embodiments.

As shown in views (a) and (b) of FIG. 44, the flexible display apparatus 100 may be realized as various shapes.

Referring to view (a) of FIG. 44, the flexible display apparatus 100 is realized as a 3D display apparatus which is not a flat panel display apparatus. Referring to view (a) of FIG. 44, the display device 110 is installed on a first side of the flexible display apparatus 100, and various types of hardware, such as a speaker, a microphone, and an IR lamp are installed on a second side of the flexible display apparatus 100.

The flexible display apparatus 100 as shown in view (a) of FIG. 44 may be formed from a rubber or a polymer resin in order to be flexibly bendable. Therefore, the whole or part of the flexible display apparatus is flexible.

The flexible display apparatus 100 performs a new operation which is different from a previous operation based on a bending. For example, the flexible display apparatus may perform a remote control function for controlling an external device in a normal state but perform a telephoning function if a bending gesture is performed in an area. When the remote control function is performed, a remote control button may be displayed on the display device 110. When the telephoning function is performed, a dial pad may be displayed on the display device 110.

View (b) of FIG. 44 is a view which illustrates the flexible display apparatus 100 which is realized in a circular shape. Therefore, visually and functionally different operations are performed based on an orientation, a shape, or a folded shape of the flexible display apparatus 100. For example, if the flexible display apparatus 100 is horizontally oriented, a picture or other contents may be displayed. If the flexible display apparatus 100 stands vertically, the flexible display apparatus 100 may perform a table clock function. Alternatively, if a central part of the flexible display apparatus 100 is bent at an angle of 90°, the flexible display apparatus 100 may perform a notebook PC function. In this case, a soft keyboard is displayed in one of folded areas, and a display window is displayed in another area.

As described above, according to the exemplary embodiments described above, if a series of consecutive changes occur in a flexible display apparatus, the consecutive changes may be connected to a feedback of a screen to be provided. Therefore, a user may intuitively perform various operations.

The above-described various methods may be realized as applications.

In particular, according to an exemplary embodiment, there may be provided a non-transitory computer readable medium which stores a program which performs: displaying at least one object; and if a bending line is continuously moved in a first direction on a flexible display apparatus and thus reaches a location of the at least one object, displaying a visual feedback with respect to the at least one object.

According to the above-described various exemplary embodiments, there may be provided a non-transitory computer readable medium which stores a program for providing a feedback effect.

The non-transitory computer readable medium refers to a medium which does not store data for a short time such as a register, a cache memory, a memory, or the like but semi-permanently stores data and is readable by a device. In particular, the above-described applications or programs may be stored and provided on a non-transitory computer readable medium such as a CD, a DVD, a hard disk, a blue-ray disk, a USB, a memory card, a ROM, or the like.

Accordingly, if an existing flexible display apparatus has a bending sensing structure, the above-described programs may be installed in the existing flexible display apparatus. Therefore, an intuitive effect based on a bending state may be provided as described above.

The foregoing exemplary embodiments and advantages are merely exemplary and are not to be construed as limiting. The present disclosure can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible apparatus comprising:
a flexible display;
a sensor for detecting a bending of the flexible display; and
a controller for controlling the flexible display to present a plurality of visual elements arranged in a first direction and, if the controller determines that a bending location of the flexible display based on a bending in a second direction is continuously shifted along the first direction and thus reaches a display location of at least one visual element among the plurality of visual elements, to display the at least one visual element located in the bending location visually distinguished from other visual elements according to shifting of the bending location,
wherein the controller is configured to determine that the bending location is continuously shifted along the first direction based on move of the bending location,
wherein the controller is further configured to provide a visual feedback varying according to a move speed of the bending location,
wherein the first direction is a landscape direction of the flexible display and the second direction is a portrait direction of the flexible display,
wherein the controller is further configured to transmit the at least one visual element in the display location to an external device, and
wherein the controller is further configured to, in response to the at least one visual element in the display location being transmitted to the external device, cause the at least one visual element in the display location to disappear from the display location.

2. The flexible apparatus of claim 1,
wherein if the bending location reaches the location of the at least one visual element presented on the flexible display, the controller controls the flexible display to provide a visual feedback with respect to the at least one visual element and the first direction in which the bending location is moved.

3. The flexible apparatus of claim 1, further comprising:
a first communicator which is connected to a display apparatus which displays the at least one visual element,
wherein if the bending location reaches a location corresponding to a display location of the at least one visual element displayed on the display apparatus, the controller controls the display apparatus to provide a visual feedback with respect to the at least one visual element and the first direction in which the bending location is moved.

4. The flexible apparatus of claim 1, wherein the controller controls to provide a first visual feedback with respect to the at least one visual element which first visual feedback is different from a second visual feedback with respect to at least a second visual element.

5. The flexible apparatus of claim 1, wherein the controller controls to provide a visual feedback which includes at least one of a zoom-in/zoom-out effect, a highlight effect, a content execution effect, a lower menu display effect, and a detailed content display effect.

6. The flexible apparatus of claim 1, wherein the controller controls to provide the visual feedback based on a move direction of the bending location.

7. A flexible apparatus comprising:
a flexible display;
a sensor for detecting a bending of the flexible display; and
a controller for controlling the flexible display to present a plurality of visual elements arranged in a first direction and, if the controller determines that a bending location of the flexible display based on a bending in a second direction is continuously shifted along the first direction, the controller controls to move at least one visual element among the plurality of visual elements, which is displayed in a first display location which corresponds to the bending location, into a second display location which corresponds to a second location, and controls to display the at least one visual element in the second display location,
wherein the controller is configured to determine that the bending location is continuously shifted along the first direction based on move of the bending location,
wherein the controller is further configured to provide a visual feedback varying according to a move speed of the bending location,
wherein the first direction is a landscape direction of the flexible display and the second direction is a portrait direction of the flexible display,
wherein the controller is further configured to transmit the at least one visual element in the second display location to an external device, and
wherein the controller is further configured to, in response to the at least one visual element in the second display location being transmitted to the external device, cause the at least one visual element in the second display location to disappear from the second display location.

8. The flexible apparatus of claim 7, wherein the at least one visual element is displayed in one of the flexible display of the flexible apparatus and a display of an external display apparatus.

9. A method for controlling a flexible apparatus, the method comprising:
detecting a bending of a flexible display;
presenting a plurality of visual elements arranged in a first direction on the flexible display;
determining whether a bending location of the flexible display based on a bending in a second direction is continuously shifted along the first direction and thus reaches a display location of at least one visual element among the plurality of visual elements, and, in response to determining that the bending location is continuously shifted along the first direction and reaches the display location, controlling the flexible display to display the at least one visual element located in the bending location visually distinguished from other visual elements according to shifting of the bending location;

transmitting the at least one visual element in the display location to an external device; and in response to the at least one visual element in the display location being transmitted to the external device, controlling to cause the at least one visual element in the display location to disappear from the display location, wherein the determining comprises determining that the bending location is continuously shifted along the first direction based on move of the bending location, wherein the controlling comprises providing a visual feedback varying according to a move speed of the bending location, and wherein the first direction is a landscape direction of the flexible display and the second direction is a portrait direction of the flexible display.

10. The method of claim 9, wherein if the bending location reaches the display location of the at least one visual element presented on the flexible display, a visual feedback is controlled to be provided with respect to the at least one visual element and the first direction in which the bending location is moved.

11. The method of claim 9, further comprising:

communicating with a display apparatus which displays the at least one visual element, wherein if the bending location reaches the display location of the at least one visual element displayed by the display apparatus, a control signal for providing a visual feedback with respect to the at least one visual element and the first direction in which the bending location is moved is transmitted to the display apparatus.

12. The method of claim 9, wherein a first visual feedback is controlled to be provided with respect to the at least one visual element, which first visual feedback is different from a second visual feedback with respect to at least a second visual element.

13. The method of claim 9, wherein the controlling comprises providing a visual feedback which includes at least one of a zoom-in/zoom-out effect, a highlight effect, a content execution effect, a lower menu display effect, and a detailed content display effect.

14. The method of claim 9, wherein the visual feedback is controlled to be provided based on a move direction of the bending location.

15. A method for controlling a flexible apparatus, the method comprising:

detecting a bending of a flexible display;

presenting a plurality of visual elements arranged in a first direction on the flexible display;

determining whether a bending location of the flexible display based on a bending in a second direction and corresponding to a first display location is continuously shifted along the first direction and thus reaches a second display location, and, in response to determining that the bending location is continuously shifted along the first direction and reaches the second display location, moving at least one visual element of the plurality of visual elements which is displayed in the first display location into the second display location and displaying the at least one visual element in the second display location;

transmitting the at least one visual element in the second display location to an external device;

in response to the at least one visual element in the second location being transmitted to the external device, controlling to cause the at least one visual element in the second display location to disappear front the second display location, wherein the determining comprises determining that the bending location is continuously shifted along the first direction based on move of the bending location, wherein the moving comprises providing a visual feedback varying according to a move speed of the bending location, and wherein the first direction is a landscape direction of the flexible display and the second direction is a portrait direction of the flexible display.

16. The method of claim 15, wherein the at least one visual element is displayed on one of the flexible display of the flexible apparatus and a display installed in an external display apparatus.

* * * * *